(12) United States Patent
Liu

(10) Patent No.: US 10,728,357 B2
(45) Date of Patent: *Jul. 28, 2020

(54) METHOD FOR CACHING DATA AND FORWARDING DEVICE

(71) Applicant: Huawei Technologies Co., Ltd., Shenzhen (CN)

(72) Inventor: Shucheng Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,358

(22) Filed: Apr. 26, 2019

(65) Prior Publication Data

US 2019/0253513 A1   Aug. 15, 2019

Related U.S. Application Data

(63) Continuation of application No. 15/331,480, filed on Oct. 21, 2016, now Pat. No. 10,320,931, which is a
(Continued)

(30) Foreign Application Priority Data

Apr. 22, 2014   (CN) .......................... 2014 1 0163126

(51) Int. Cl.
*G06F 15/173*     (2006.01)
*H04L 29/08*      (2006.01)

(52) U.S. Cl.
CPC ...... *H04L 67/2842* (2013.01); *H04L 67/2852* (2013.01); *H04L 67/327* (2013.01)

(58) Field of Classification Search
CPC .................. H04L 67/2842; H04L 67/2852
(Continued)

(56) References Cited

U.S. PATENT DOCUMENTS

2011/0107030 A1   5/2011   Borst et al.
2012/0159176 A1   6/2012   Ravindran et al.
(Continued)

FOREIGN PATENT DOCUMENTS

CN   101184021 A   5/2008
CN   103001870 A   3/2013
(Continued)

OTHER PUBLICATIONS

U.S. Appl. No. 15/331,480, filed Oct. 21, 2016.
(Continued)

*Primary Examiner* — Dustin Nguyen
*Assistant Examiner* — Joel Mesa
(74) *Attorney, Agent, or Firm* — Leydig, Voit & Mayer, Ltd.

(57) ABSTRACT

The present application discloses a method for caching data. The method includes: a controller calculates a local caching gain of first content for each forwarding device on the first content delivery path, wherein a local caching gain of the first content of an $i^{th}$ forwarding device is generated by calculation according to a first parameter and a popularity of the first content, and the first parameter is used for identifying bandwidth consumed by transmitting the first content between the $i^{th}$ forwarding device and the server. The controller obtains a first caching gain, wherein the first caching gain is a maximum value of local caching gains of all forwarding devices on the first content delivery path. The controller sends the first caching gain to the server and sends the local caching gain of the first content to the $i^{th}$ forwarding device.

9 Claims, 7 Drawing Sheets

Related U.S. Application Data continuation of application No. PCT/CN2015/075788, filed on Apr. 2, 2015.

(58) Field of Classification Search
USPC .......................................................... 709/226
See application file for complete search history.

(56) References Cited

U.S. PATENT DOCUMENTS

| | | |
|---|---|---|
| 2013/0018937 A1 | 1/2013 | Kim et al. |
| 2013/0275618 A1 | 10/2013 | Puttaswamy et al. |
| 2014/0201311 A1* | 7/2014 | Lau ...................... H04W 88/08 |
| | | 709/213 |

FOREIGN PATENT DOCUMENTS

| | | |
|---|---|---|
| CN | 103262063 A | 8/2013 |
| CN | 103428267 A | 12/2013 |
| CN | 103501315 A | 1/2014 |
| CN | 103634231 A | 3/2014 |
| WO | 2014081264 A1 | 5/2014 |

OTHER PUBLICATIONS

Chai et al., "Cache 'Less for More', in Information-Centric Networks," Networking, Part 1, XP19188012 International Federation for Information Processing (2012).
Psaras et al., "Probabilistic In-Network Caching for Information-Centric Networks," XP58008099, pp. 55-60, ACM (2012).

* cited by examiner

METHOD FOR CACHING DATA AND FORWARDING DEVICE

CROSS-REFERENCE TO RELATED APPLICATIONS

This application is a continuation of U.S. patent application Ser. No. 15/331,480 (now U.S. Pat. No. 10,320,931), filed on Oct. 21, 2016, which is a continuation of International Patent Application No. PCT/CN2015/075788, filed on Apr. 2, 2015, which claims priority to Chinese Patent Application No. 201410163126.0, filed on Apr. 22, 2014. The disclosures of the aforementioned applications are hereby incorporated by reference in their entireties.

TECHNICAL FIELD

The present disclosure relates to communications technologies, and in particular, to a method for caching data and a forwarding device.

BACKGROUND

A router in a content-centric network (CCN) is configured with a caching function, which can rapidly respond to a request from user equipment, so as to save bandwidth of the CCN. For example, user equipment sends a request to a router on a content delivery path, and the content delivery path is a packet transmission path between the user equipment and a server. The content delivery path includes at least one router, the server is configured to provide content corresponding to the request, and a name of the content is carried in the request. The router includes a content store (CS) for caching the content. If it is determined that the content is cached in the CS, the router may send the content cached in the CS to the user equipment according to the name of the content. If it is determined that the content is not cached in the CS, the router queries, in a stored pending interest table (PIT), whether an entry corresponding to the name of the content exists. If an entry corresponding to the name of the content exists in the PIT, an interface for receiving the request is added to the PIT. If no entry corresponding to the name of the content exists in the PIT, an entry corresponding to the name of the content is added in the PIT and the content is requested from the server. The router may cache the content from the server according to a cache placement strategy.

In an existing cache placement strategy, an on-path caching strategy determines a caching location of content mainly according to a popularity of the content. The popularity of the content may be expressed by a quantity of times of requesting the content within a preset time, the requesting is requesting the same content, and the caching location of the content is a router for caching the content. For example, a local popularity based caching (LPBC) strategy is that a router caches content with a highest popularity. When performing caching according to the LPBC strategy, the router takes only the popularity of the content into account, without taking impact of caching the content on network bandwidth into account.

SUMMARY

In view of this, embodiments of the present disclosure provide a method for caching data and a forwarding device, which can determine a caching location of content according to a popularity of the content and impact of caching the content on network bandwidth, so as to save the network bandwidth.

Technical solutions provided in the embodiments of the present disclosure are as follows:

According to a first aspect, a method for caching data is provided, and the method includes:

receiving, by an $i^{th}$ forwarding device on a first content delivery path, a first data packet from a server, where the first content delivery path is a packet transmission path between first user equipment and the server, a quantity of all forwarding devices on the first content delivery path is k, i is an integer that is greater than or equal to 1 and that is less than or equal to k, the first data packet includes a caching gain, first content, and an identity of the first content, the caching gain is a maximum value of local caching gains of all the forwarding devices on the first content delivery path, and the local caching gains of all the forwarding devices on the first content delivery path correspond to the identity of the first content;

determining, by the $i^{th}$ forwarding device, whether the caching gain in the first data packet matches a local caching gain corresponding to the identity of the first content, where the local caching gain corresponding to the identity of the first content is generated by calculation according to a first parameter and a popularity of the first content, and the first parameter is used for identifying bandwidth consumed by transmitting the first content between the $i^{th}$ forwarding device and the server; and if the $i^{th}$ forwarding device determines that the caching gain in the first data packet matches the local caching gain corresponding to the identity of the first content, caching, by the $i^{th}$ forwarding device, the first content included in the first data packet.

In a first possible implementation manner of the first aspect, the method further includes:

if the $i^{th}$ forwarding device determines that the caching gain in the first data packet does not match the local caching gain corresponding to the identity of the first content, sending, by the $i^{th}$ forwarding device, the first data packet through the first content delivery path to a device requesting the first content, where the device requesting the first content is a device that sends a first request packet to the $i^{th}$ forwarding device, and the first request packet is used for requesting the server to provide the first content.

With reference to the first aspect or the first possible implementation manner of the first aspect, a second possible implementation manner of the first aspect is further provided, and before the receiving, by an $i^{th}$ forwarding device, a first data packet from a server, the method further includes:

receiving, by the $i^{th}$ forwarding device, the first request packet, where the first request packet is used for requesting the server to provide the first content, the first request packet includes a caching gain and the identity of the first content, the caching gain in the first request packet is a maximum value of local caching gains of all forwarding devices on a path from the first user equipment to an $(i-1)^{th}$ forwarding device on the first content delivery path, the $(i-1)^{th}$ forwarding device is a previous hop of the $i^{th}$ forwarding device on the first content delivery path along a direction from the first user equipment to the server, and the local caching gains of all the forwarding devices on the path from the first user equipment to the $(i-1)^{th}$ forwarding device on the first content delivery path correspond to the identity of the first content;

obtaining, by the $i^{th}$ forwarding device, a second request packet, where the second request packet includes a caching gain and the identity of the first content, the caching gain in the second request packet is a maximum value of local caching gains of all forwarding devices on a path from the first user equipment to the $i^{th}$ forwarding device on the first content delivery path, and the local caching gains of all the forwarding devices on the path from the first user equipment to the $i^{th}$ forwarding device on the first content delivery path correspond to the identity of the first content; and sending, by the $i^{th}$ forwarding device, the second request packet to a next hop along the first content delivery path, where the next hop is a next hop of the $i^{th}$ forwarding device on the first content delivery path along the direction from the first user equipment to the server.

With reference to the second possible implementation manner of the first aspect, a third possible implementation manner of the first aspect is further provided, and after the sending the second request packet to a next hop, the method further includes:

receiving, by the $i^{th}$ forwarding device, a third request packet from a $j^{th}$ forwarding device, where the third request packet is used for requesting the server to provide the first content, the third request packet includes a caching gain and the identity of the first content, the $j^{th}$ forwarding device is a previous hop of the $i^{th}$ forwarding device on a second content delivery path along a direction from second user equipment to the server, the second content delivery path is a packet transmission path between the second user equipment and the server, the caching gain in the third request packet is a maximum value of local caching gains of all forwarding devices on a path from the second user equipment to the $j^{th}$ forwarding device on the second content delivery path, and the local caching gains of all the forwarding devices on the path from the second user equipment to the $j^{th}$ forwarding device on the second content delivery path correspond to the identity of the first content; and storing the caching gain that is in the third request packet and a parameter that identifies the $j^{th}$ forwarding device.

With reference to the third possible implementation manner of the first aspect, a fourth possible implementation manner of the first aspect is further provided, and after the caching the first content included in the first data packet, the method further includes:

if the caching gain in the third request packet is greater than the caching gain in the first data packet, obtaining, by the $i^{th}$ forwarding device, a second data packet, where the second data packet includes the caching gain in the third request packet, the first content, and the identity of the first content; and sending the second data packet to the $j^{th}$ forwarding device according to the parameter identifying the $j^{th}$ forwarding device.

With reference to any possible implementation manner of the second possible implementation manner of the first aspect to the fourth possible implementation manner of the first aspect, a fifth possible implementation manner of the first aspect is further provided, and before the obtaining, by the $i^{th}$ forwarding device, a second request packet, the method further includes:

calculating, by the $i^{th}$ forwarding device, the local caching gain corresponding to the identity of the first content; or obtaining, by the $i^{th}$ forwarding device, the local caching gain corresponding to the identity of the first content from a controller, where the controller is configured to calculate the local caching gain corresponding to the identity of the first content for the $i^{th}$ forwarding device.

With reference to any one of the foregoing possible implementation manners, a sixth possible implementation manner of the first aspect is further provided, where the local caching gain corresponding to the identity of the first content is a product of a gain of the first content and a weight of the first content, and the gain of the first content is a product of the first parameter, a weight of the first parameter, the popularity of the first content, and a weight of the popularity of the first content.

With reference to any one of the foregoing possible implementation manners, a seventh possible implementation manner of the first aspect is further provided, where when storage space occupied by content cached on the $i^{th}$ forwarding device reaches a predefined threshold, the local caching gain corresponding to the identity of the first content is a difference obtained by subtracting a product of a gain of second content and a weight of the second content from the product of the gain of the first content and the weight of the first content, where the gain of the first content is the product of the first parameter, the weight of the first parameter, the popularity of the first content, and the weight of the popularity of the first content, the gain of the second content is a product of a second parameter, a weight of the second parameter, a popularity of the second content, and a weight of the popularity of the second content, and the second parameter is used for identifying bandwidth consumed by transmitting the second content between the $i^{th}$ forwarding device and a server providing the second content.

With reference to the sixth possible implementation manner or the seventh possible implementation manner of the first aspect, the caching the first content included in the first data packet includes:

when the $i^{th}$ forwarding device determines that the storage space occupied by the cached content reaches the predefined threshold, selecting a content set that matches a size of the first content from the cached content; and replacing the content set that matches the size of the first content with the first content.

According to a second aspect, a forwarding device is provided, where the forwarding device is located on a first content delivery path, the first content delivery path is a packet transmission path between first user equipment and a server, a quantity of all forwarding devices on the first content delivery path is k, the forwarding device is an $i^{th}$ forwarding device, i is an integer that is greater than or equal to 1 and that is less than or equal to k, and the forwarding device includes:

a second storing unit, configured to store a local caching gain corresponding to an identity of first content;

a first receiving unit, configured to receive a first data packet from the server, where the first data packet includes a caching gain, the first content, and the identity of the first content, the caching gain in the first data packet is a maximum value of local caching gains of all the forwarding devices on the first content delivery path, the local caching gain corresponding to the identity of the first content is generated by calculation according to a first parameter and a popularity of the first content, the first parameter is used for identifying bandwidth consumed by transmitting the first content between the $i^{th}$ forwarding device and the server, and the local caching gains of all the forwarding devices on the first content delivery path correspond to the identity of the first content;

a first controlling unit, configured to determine whether the caching gain in the first data packet matches the local caching gain that corresponds to the identity of the first content and that is stored in the second storing unit; and a first storing unit, configured to: if the first controlling unit determines that the caching gain in the first data packet matches the local caching gain that corresponds to the identity of the first content and that is stored in the second storing unit, cache the first content that is in the first data packet.

In a first possible implementation manner of the second aspect, the forwarding device further includes:

a first sending unit, configured to: if the first controlling unit determines that the caching gain in the first data packet does not match the local caching gain that corresponds to the identity of the first content and that is stored in the second storing unit, send the first data packet through the first content delivery path to a device requesting the first content, where the device requesting the first content is a device that sends a first request packet to the $i^{th}$ forwarding device, and the first request packet is used for requesting the server to provide the first content.

With reference to the second aspect or the first possible implementation manner of the second aspect, a second possible implementation manner of the second aspect is further provided, where the forwarding device further includes:

a second receiving unit, configured to receive the first request packet, where the first request packet is used for requesting the server to provide the first content, the first request packet includes a caching gain and the identity of the first content, the caching gain in the first request packet is a maximum value of local caching gains of all forwarding devices on a path from the first user equipment to an $(i-1)^{th}$ forwarding device on the first content delivery path, the $(i-1)^{th}$ forwarding device is a previous hop of the $i^{th}$ forwarding device on the first content delivery path along a direction from the first user equipment to the server, and the local caching gains of all the forwarding devices on the path from the first user equipment to the $(i-1)^{th}$ forwarding device on the first content delivery path correspond to the identity of the first content;

a first obtaining unit, configured to obtain a second request packet, where the second request packet includes a caching gain and the identity of the first content, the caching gain in the second request packet is a maximum value of local caching gains of all forwarding devices on a path from the first user equipment to the $i^{th}$ forwarding device on the first content delivery path, and the local caching gains of all the forwarding devices on the path from the first user equipment to the $i^{th}$ forwarding device on the first content delivery path correspond to the identity of the first content; and a second sending unit, configured to send the second request packet to a next hop along the first content delivery path, where the next hop is a next hop of the $i^{th}$ forwarding device on the first content delivery path along the direction from the first user equipment to the server.

With reference to the second possible implementation manner of the second aspect, a third possible implementation manner of the second aspect is further provided, where the forwarding device further includes:

a third receiving unit, configured to receive a third request packet from a $j^{th}$ forwarding device, where the third request packet is used for requesting the server to provide the first content, the third request packet includes a caching gain and the identity of the first content, the $j^{th}$ forwarding device is a previous hop of the $i^{th}$ forwarding device on a second content delivery path along a direction from second user equipment to the server, the second content delivery path is a packet transmission path between the second user equipment and the server, the caching gain in the third request packet is a maximum value of local caching gains of all forwarding devices on a path from the second user equipment to the $j^{th}$ forwarding device on the second content delivery path, and the local caching gains of all the forwarding devices on the path from the second user equipment to the $j^{th}$ forwarding device on the second content delivery path correspond to the identity of the first content; and a second controlling unit, configured to store, in the second storing unit, the caching gain that is in the third request packet and a parameter that identifies the $j^{th}$ forwarding device.

With reference to the third possible implementation manner of the second aspect, a fourth possible implementation manner of the second aspect is further provided, where the forwarding device further includes:

a second obtaining unit, configured to: if the caching gain that is in the third request packet and that is stored in the second storing unit is greater than the caching gain in the first data packet, obtain a second data packet, where the second data packet includes the caching gain in the third request packet, the first content, and the identity of the first content; and a third sending unit, configured to send the second data packet to the $i^{th}$ forwarding device according to the parameter that identifies the $j^{th}$ forwarding device and that is stored in the second storing unit.

According to a third aspect, a controller is provided, where the controller communicates with first user equipment, a server, and each forwarding device on a first content delivery path, the first content delivery path is a packet transmission path between the first user equipment and the server, and the controller includes:

a first calculating unit, configured to calculate a local caching gain of first content for each forwarding device on the first content delivery path, where an $i^{th}$ forwarding device is any one of forwarding devices on the first content delivery path, a local caching gain of the first content of the $i^{th}$ forwarding device is generated by calculation according to a first parameter and a popularity of the first content, and the first parameter is used for identifying bandwidth consumed by transmitting the first content between the $i^{th}$ forwarding device and the server;

a first obtaining unit, configured to obtain a first caching gain, where the first caching gain is a maximum value of local caching gains of all forwarding devices on the first content delivery path, and the local caching gains of all the forwarding devices on the first content delivery path correspond to an identity of the first content; and a first sending unit, configured to send the first caching gain to the server periodically and send the local caching gain of the first content to the $i^{th}$ forwarding device periodically.

In a first possible implementation manner of the third aspect, the controller further includes:

a second calculating unit, configured to calculate a local caching gain of the first content for each forwarding device on a second content delivery path, where the second content delivery path is a packet transmission path between second user equipment and the server, and a path overlapped between the second content delivery path and the first content delivery path is a path between the $i^{th}$ forwarding device and the server;

a second obtaining unit, configured to obtain a second caching gain, where the second caching gain is a maximum value of local caching gains of all forwarding devices on a path from the second user equipment to a $j^{th}$ forwarding device on the second content delivery path, the local caching gains of all the forwarding devices on the path from the second user equipment to the $j^{th}$ forwarding device on the second content delivery path correspond to the identity of the first content, and the $j^{th}$ forwarding device is a previous hop of the $i^{th}$ forwarding device on the second content delivery path along a direction from the second user equipment to the server; and a second sending unit, configured to send the second caching gain to the $i^{th}$ forwarding device periodically.

According to the foregoing solutions, if a local caching gain corresponding to an identity of first content matches a caching gain in a received first data packet, an $i^{th}$ forwarding device on a content delivery path caches the first content that is in the first data packet. By using the caching gain in the first data packet, the first content in the first data packet is cached on a forwarding device with a maximum local caching gain corresponding to the first content on a first content delivery path, for example, the $i^{th}$ forwarding device, realizing that a caching location of content is determined according to a popularity of the content and impact of caching the content on network bandwidth. The local caching gain corresponding to the identity of the first content on the $i^{th}$ forwarding device is a maximum value of local caching gains of all forwarding devices on the first content delivery path, and a factor of bandwidth between the $i^{th}$ forwarding device and a server is taken into account in calculation of the local caching gain corresponding to the identity of the first content, so as to further save network bandwidth when the $i^{th}$ forwarding device caches the first content.

BRIEF DESCRIPTION OF DRAWINGS

To illustrate the technical solutions in the embodiments of the present disclosure more clearly, the following briefly introduces accompanying drawings required for describing the embodiments. Apparently, the accompanying drawings in the following description are some embodiments of the present disclosure, and a person of ordinary skill in the art may still derive other drawings according to these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
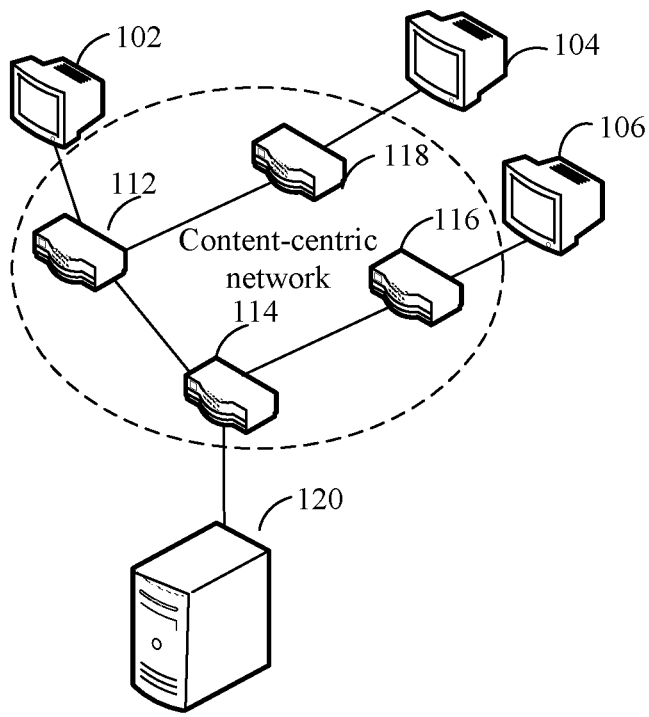
FIG. 1 is a schematic diagram of a deployment scenario according to an embodiment of the present disclosure.

FIG. 1 illustrates a specific deployment instance. This network environment includes at least three user equipments 102, 104, and 106, a CCN, and at least one server 120 for providing content. A plurality of forwarding devices 112, 114, 116, and 118 are included in the CCN. A forwarding device may be a network device, such as a router or a switch, capable of processing a packet and forwarding a packet. The user equipment 102 communicates with the forwarding device 112 in the CCN. The user equipment 104 communicates with the forwarding device 118 in the CCN. The user equipment 106 communicates with the forwarding device 116 in the CCN. The forwarding device 112 is separately connected to the forwarding devices 114 and 118. The forwarding device 114 is separately connected to the forwarding devices 112 and 116 and the server 120. This network environment includes a plurality of content delivery paths. In the following embodiments of the present disclosure, an exemplary illustration is given by using a packet transmission path between the user equipment 102 and the server 120 as a first content delivery path. Certainly, any one of the content delivery paths in this network environment may be used as the first content delivery path, which is not described one by one by using an example in the following embodiments.

Figure 2:
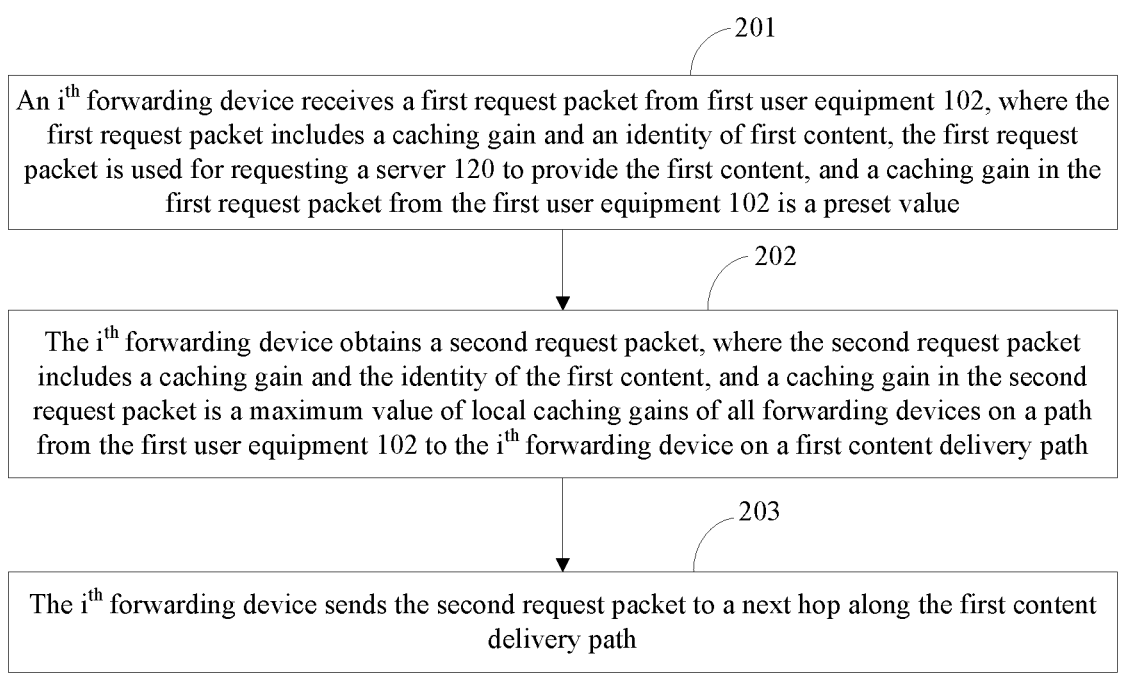
FIG. 2 is a flowchart illustrating a method for sending a request packet according to an embodiment of the present disclosure.

FIG. 2 is a flowchart illustrating a method for sending a request packet according to an embodiment of the present disclosure. The following introduces the method for sending a request packet shown in FIG. 2 in detail from a perspective of an $i^{th}$ forwarding device on a first content delivery path. The first content delivery path is a packet transmission path between first user equipment 102 and a server 120. A direction of transmitting the request packet on the first content delivery path is a direction from the first user equipment 102 to the server 120. A quantity of forwarding devices on the first content delivery path is k. The $i^{th}$ forwarding device is any one of the forwarding devices on the first content delivery path. i is an integer that is greater than or equal to 1 and that is less than or equal to k. The server 120 is used for providing first content requested by the first user equipment 102. The method includes the following operations:

201. The $i^{th}$ forwarding device receives a first request packet from the first user equipment 102, where the first request packet includes a caching gain and an identity of the first content, the first request packet is used for requesting the server 120 to provide the first content, and the caching gain in the first request packet from the first user equipment 102 is a preset value.

For example, the first content delivery path may be a path planned according to the Routing Information Protocol (RIP), the Open Shortest Path First (OSPF) protocol, or traffic engineering (TE). The first content delivery path is used for transmitting a packet, for example, a data packet or a request packet, between the first user equipment 102 and the server 120. The data packet is a packet used for carrying the first content and sent by the server 120. The identity of the first content may be a name of the first content or a uniform resource locator (URL) corresponding to the first content.

202. The $i^{th}$ forwarding device obtains a second request packet, where the second request packet includes a caching gain and the identity of the first content, and the caching gain in the second request packet is a maximum value of local caching gains of all forwarding devices on a path from the first user equipment 102 to the $i^{th}$ forwarding device on the first content delivery path.

The local caching gains of all the forwarding devices on the path from the first user equipment 102 to the $i^{th}$ forwarding device on the first content delivery path correspond to the identity of the first content. For example, the $i^{th}$ forwarding device has a plurality of local caching gains, and each local caching gain corresponds to an identity of content. Using FIG. 1 as an example, assuming that the $i^{th}$ forwarding device is a forwarding device 114, a maximum value of a local caching gain corresponding to the identity of the first content of a forwarding device 112 and a local caching gain corresponding to the identity of the first content of the forwarding device 114 is the caching gain in the second request packet.

For example, the $i^{th}$ forwarding device may replace the caching gain in the first request packet with a local caching gain of the first content to form the second request packet. Alternatively, the $i^{th}$ forwarding device may generate the second request packet, where the second request packet includes a local caching gain of the first content and the identity of the first content. The local caching gain of the first content is a local caching gain corresponding to the identity of the first content on the $i^{th}$ forwarding device.

The $i^{th}$ forwarding device generates a gain of content periodically according to a calculation formula of a gain of content. A calculation formula of a gain of content on the $i^{th}$ forwarding device may be expressed as:

$$\text{PlaceGain}_i^m = \alpha r_i^m \times \beta h_i^m \times \lambda s_m \tag{1}$$

In the formula (1), i is used for identifying the $i^{th}$ forwarding device, m is used for identifying the content, $\text{PlaceGain}_i^m$ is used for identifying a gain of m on the $i^{th}$ forwarding device, and $r_i^m$ is used for identifying a popularity of m on the $i^{th}$ forwarding device. $\alpha$ is used for identifying a weight of $r_i^m$, and $\alpha$ is a coefficient set according to criticality of $r_i^m$ in calculation of $\text{PlaceGain}_i^m$. $h_i^m$ is used for identifying bandwidth consumed by transmitting unit content included in m between the $i^{th}$ forwarding device and a server 120 providing m. $\beta$ is used for identifying a weight of $h_i^m$, and $\beta$ is a coefficient set according to criticality of $h_i^m$ in the calculation of PlaceGain$_i^m$. $s_m$ is used for identifying a quantity of unit content included in m. $\lambda$ is used for identifying a weight of $s_m$, and $\lambda$ is a coefficient set according to criticality of $s_m$ in the calculation of PlaceGain$_i^m$. Values of $\alpha$, $\beta$, and $\lambda$ are greater than 0. A product of $h_i^m$ and $s_m$ may be used for identifying bandwidth consumed by transmitting m between the $i^{th}$ forwarding device and the server 120 providing m. The unit content may be content in a unit of a group, or may be content in a unit of a file, or may be content in a unit of a bit.

For example, the values of $\alpha$, $\beta$, and $\lambda$ are all 1, m1 is used for identifying the first content requested by the first user equipment 102, and the $i^{th}$ forwarding device generates a gain of m1 according to a first parameter and $r_i^{m_1}$. The first parameter is a product of $h_i^{m_1}$ and $s_{m_1}$. The first parameter is used for identifying bandwidth consumed by transmitting m1 between the $i^{th}$ forwarding device and the server 120. The first parameter may be expressed by a quantity of hops between the $i^{th}$ forwarding device and the server 120 on the first content delivery path. Alternatively, the first parameter may be expressed by a sum of weights of multi-hop links between the $i^{th}$ forwarding device and the server 120 on the first content delivery path. A weight of a per-hop link may be inversely proportional to bandwidth of the per-hop link, or may be a parameter preset according to a network optimization demand. Alternatively, the first parameter may be expressed by transmission time delay generated by transmitting the first content between the $i^{th}$ forwarding device and the server 120 on the first content delivery path. $r_i^{m_1}$ may be expressed by a quantity of request packets received by the $i^{th}$ forwarding device within a preset time. The request packet received by the $i^{th}$ forwarding device includes an identity m1 of the first content. Alternatively, $r_i^{m_1}$ may be expressed as a calculation result of the quantity of the request packets received by the $i^{th}$ forwarding device within the preset time and a weighted value. A calculation method of the quantity of the request packets received by the $i^{th}$ forwarding device within the preset time and the weighted value includes: setting a weighted value of a user for user equipment requesting the first content according to a level or importance of the user; and using a product of a quantity of request packets sent by the user equipment and the weighted value of the user as $r_i^{m_1}$. For example, if a weighted value of a user of the first user equipment 102 is 2, the first user equipment 102 sends a packet for requesting the first content to the $i^{th}$ forwarding device, and an increased value of a popularity of the first content counted on the $i^{th}$ forwarding device is 2; if a weighted value of a user of the first user equipment 102 is 1, the first user equipment 102 sends a packet for requesting the first content to the $i^{th}$ forwarding device, and an increased value of a popularity of the first content counted on the $i^{th}$ forwarding device is 1.

Before receiving the first request packet or when receiving the first request packet, the $i^{th}$ forwarding device may obtain a local caching gain of the first content according to a generated gain of the first content. Alternatively, the $i^{th}$ forwarding device obtains a local caching gain of the first content periodically according to a gain of the first content. Alternatively, the $i^{th}$ forwarding device obtains a local caching gain according to a received instruction. The local caching gain of the first content is a local caching gain corresponding to the identity of the first content.

For example, if storage space occupied by content cached on the $i^{th}$ forwarding device does not reach a predefined threshold, the local caching gain corresponding to the identity of the first content may be a product of a gain of the first content and a weight of the first content. The predefined threshold is used for identifying a capacity of storage space for caching content on the $i^{th}$ forwarding device. The weight of the first content is used for identifying criticality of the gain of the first content in calculation of the local caching gain corresponding to the identity of the first content. A value of the weight of the first content is greater than 0. A calculation formula of the local caching gain corresponding to the identity of the first content may be expressed as:

$$\text{LocalGain} = \gamma \text{PlaceGain}_i^{m1} \quad (2)$$

In the formula (2), LocalGain is used for identifying the local caching gain of the first content. $\gamma$ is used for identifying a weight of $\text{PlaceGain}_i^{m1}$. $\gamma$ is a coefficient set according to criticality of the gain of the first content in calculation of LocalGain. A value of $\gamma$ may be greater than 0. i is used for identifying the $i^{th}$ forwarding device. m1 is used for identifying the first content requested by the first user equipment 102. $\text{PlaceGain}_i^{m1}$ is used for identifying the gain of the first content on the $i^{th}$ forwarding device. $\text{PlaceGain}_i^{m1}$ may be generated by calculation by using the formula (1).

For example, if storage space occupied by content cached on the $i^{th}$ forwarding device reaches a predefined threshold, the foregoing formula (2) may be used for calculation, or the following formula (3) may be used for calculation:

$$\text{LocalGain} = \gamma \text{PlaceGain}_i^{m1} - \delta \text{PlaceGain}_i^{m2} \quad (3)$$

In the formula (3), LocalGain is used for identifying a local caching gain. i is used for identifying the $i^{th}$ forwarding device. m1 is used for identifying the first content requested by the first user equipment 102. m2 is used for identifying second content cached on the $i^{th}$ forwarding device. The second content may be content with a minimum gain in the content cached on the $i^{th}$ forwarding device. $\gamma$ is used for identifying a weight of m1. $\text{PlaceGain}_i^{m1}$ is used for identifying the gain of the first content on the $i^{th}$ forwarding device. $\text{PlaceGain}_i^{m1}$ may be generated by calculation by using the formula (1). $\delta$ is used for identifying a weight of m2. $\delta$ is a coefficient set according to criticality of a gain of the second content in calculation of LocalGain. A value of $\delta$ may be greater than 0. $\text{PlaceGain}_i^{m2}$ is used for identifying the gain of the second content on the $i^{th}$ forwarding device. $\text{PlaceGain}_i^{m2}$ may be generated by calculation by using the formula (1).

For example, before or after obtaining the second request packet, the $i^{th}$ forwarding device may generate a PIT entry corresponding to the first content. The PIT entry includes the identity of the first content, the local caching gain corresponding to the identity of the first content, a parameter identifying the first user equipment 102, and the caching gain in the first request packet. The parameter identifying the first user equipment 102 may be an address of the first user equipment 102, or an identity of an interface through which the $i^{th}$ forwarding device receives the first request packet. The caching gain in the first request packet corresponds to the parameter identifying the first user equipment 102.

203. The $i^{th}$ forwarding device sends the second request packet to a next hop along the first content delivery path.

For example, the $i^{th}$ forwarding device may send the second request packet according to information of the next hop included in a pre-configured forwarding information base (FIB). The FIB includes the identity of the first content and the next hop. The next hop in step 203 is a next hop of the $i^{th}$ forwarding device on the first content delivery path along a direction from the first user equipment 102 to the server 120. The next hop in step 203 is the server 120 or an $(i+1)^{th}$ forwarding device. The $(i+1)^{th}$ forwarding device is located between the $i^{th}$ forwarding device and the server 120 on the first content delivery path. The next hop in the FIB may be an identity of an interface connecting the $i^{th}$ forwarding device and the next hop or an address of the $(i+1)^{th}$ forwarding device.

In the foregoing embodiment, an $i^{th}$ forwarding device selects a larger value from a caching gain in a first request packet and a local caching gain corresponding to an identity of first content. The $i^{th}$ forwarding device uses the selected larger value as a caching gain in a second request packet. The $i^{th}$ forwarding device sends the second request packet through a first content delivery path. Any one of forwarding devices on the first content delivery path may perform comparison and replacement processing on a caching gain in a received request packet and the local caching gain corresponding to the identity of the first content according to the method of the foregoing embodiment, so as to enable a server 120 to obtain, by using a request packet from the first content delivery path, a maximum value of local caching gains of all forwarding devices on the first content delivery path. The local caching gains of all the forwarding devices on the first content delivery path correspond to the identity of the first content.

Figure 3:
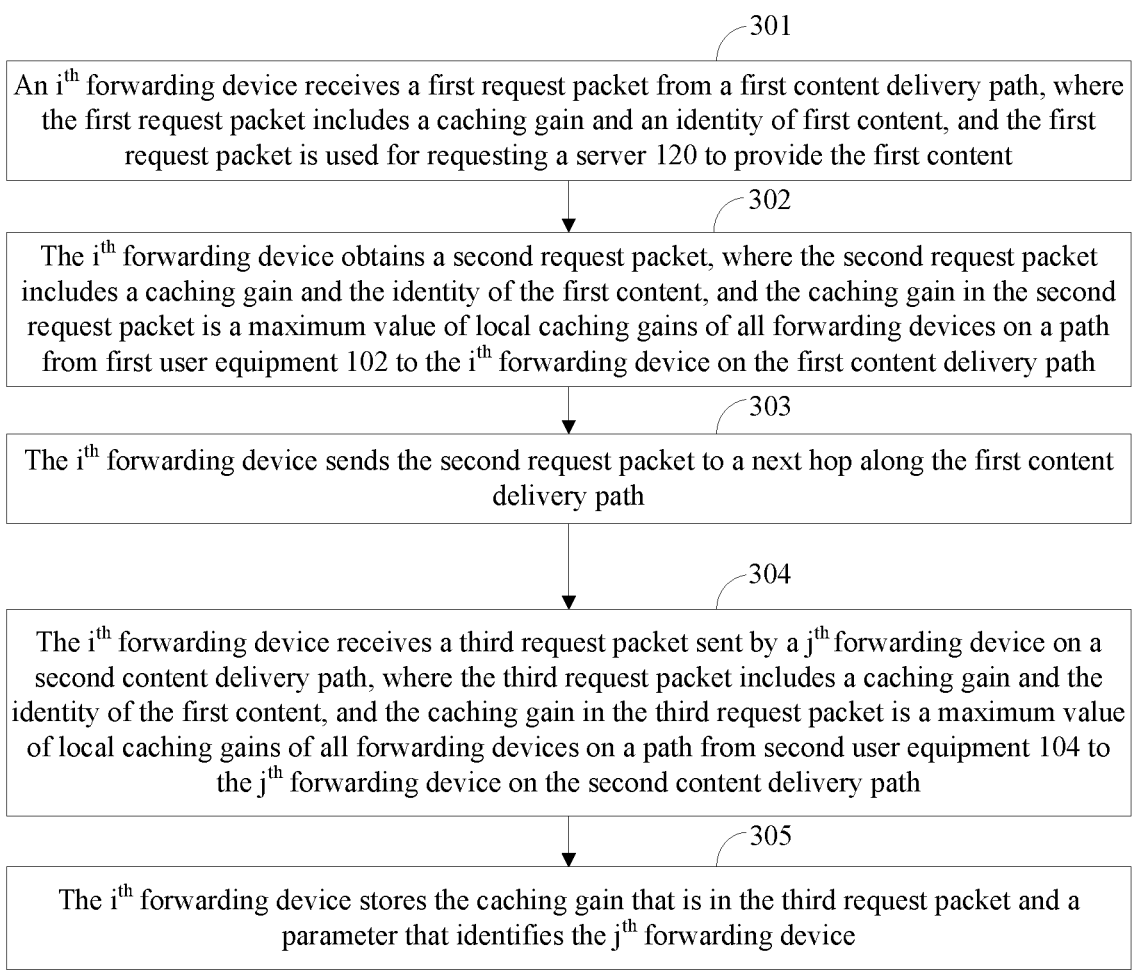
FIG. 3 is a flowchart illustrating a method for sending a request packet according to an embodiment of the present disclosure.

FIG. 3 is a flowchart illustrating a method for sending a request packet according to an embodiment of the present disclosure. The following introduces the method for sending a request packet shown in FIG. 3 in detail from a perspective of an $i^{th}$ forwarding device shared by a first content delivery path and a second content delivery path. The first content delivery path is a packet transmission path between first user equipment 102 and a server 120. A direction of transmitting a request packet on the first content delivery path is a direction from the first user equipment 102 to the server 120. A quantity of forwarding devices on the first content delivery path is k. The second content delivery path is a packet transmission path between second user equipment 104 and the server 120. A direction of transmitting a request packet on the second content delivery path is a direction from the second user equipment 104 to the server 120. An overlapping path exists between the second content delivery path and the first content delivery path, that is, a path from the $i^{th}$ forwarding device to the server 120 is the overlapping path, and i is an integer that is greater than or equal to 1 and that is less than or equal to k. The method includes the following operations:

301. The $i^{th}$ forwarding device receives a first request packet from the first content delivery path, where the first request packet includes a caching gain and an identity of first content, and the first request packet is used for requesting the server 120 to provide the first content.

For example, the first request packet received by the $i^{th}$ forwarding device is from the first user equipment 102, and the caching gain in the first request packet is a preset value. The first request packet received by the $i^{th}$ forwarding device is from an $(i-1)^{th}$ forwarding device, and the caching gain in the first request packet is a maximum value of local caching gains of all forwarding devices on a path from the first user equipment 102 to the $(i-1)^{th}$ forwarding device on the first content delivery path. The local caching gains of all the forwarding devices on the path from the first user equipment 102 to the $(i-1)^{th}$ forwarding device on the first content delivery path correspond to the identity of the first content. All the forwarding devices on the path from the first user equipment 102 to the $(i-1)^{th}$ forwarding device on the first content delivery path include the $(i-1)^{th}$ forwarding device. The $(i-1)^{th}$ forwarding device is a previous hop of the $i^{th}$ forwarding device on the first content delivery path along the direction from the first user equipment 102 to the server 120. The $(i-1)^{th}$ forwarding device may calculate a local caching gain corresponding to the identity of the first content by using the foregoing formula (2) or the foregoing formula (3).

302. The $i^{th}$ forwarding device obtains a second request packet, where the second request packet includes a caching gain and the identity of the first content, and the caching gain in the second request packet is a maximum value of local caching gains of all forwarding devices on a path from the first user equipment 102 to the $i^{th}$ forwarding device on the first content delivery path.

A method for obtaining the second request packet in step 302 is the same as the method for obtaining the second request packet in step 202 shown in FIG. 2. In step 302, the local caching gains of all the forwarding devices on the path from the first user equipment 102 to the $i^{th}$ forwarding device on the first content delivery path correspond to the identity of the first content.

The $i^{th}$ forwarding device may generate a gain of the first content periodically according to the foregoing formula (1). If content cached on the $i^{th}$ forwarding device does not reach a predefined threshold, the local caching gain corresponding to the identity of the first content may be a product of the gain of the first content and a weight of the first content, that is, the local caching gain corresponding to the identity of the first content may be calculated by using the formula (2). If content cached on the $i^{th}$ forwarding device reaches a predefined threshold, the local caching gain corresponding to the identity of the first content may be calculated by using the formula (2). Alternatively, the local caching gain corresponding to the identity of the first content is a difference between the gain of the first content and a gain of second content, that is, the local caching gain corresponding to the identity of the first content may be calculated by using the formula (3). The gain of the second content is stored on the $i^{th}$ forwarding device. The second content is content with a minimum gain in the content cached on the $i^{th}$ forwarding device.

For example, before or after obtaining the second request packet, the $i^{th}$ forwarding device may generate a PIT entry corresponding to the first content. The PIT entry includes the identity of the first content, the local caching gain corresponding to the identity of the first content, the caching gain in the first request packet, and a parameter identifying a device sending the first request packet. The parameter identifying the device sending the first request packet may be an address of the device sending the first request packet, or may be an identity of an interface through which the $i^{th}$ forwarding device receives the first request packet. The device sending the first request packet may be the first user equipment 102 or the $(i-1)^{th}$ forwarding device.

303. The $i^{th}$ forwarding device sends the second request packet to a next hop along the first content delivery path.

A method for sending the second request packet in step 303 is the same as the method for sending the second request packet in step 203 shown in FIG. 2.

304. The $i^{th}$ forwarding device receives a third request packet sent by a $j^{th}$ forwarding device on a second content delivery path, where the third request packet includes a caching gain and the identity of the first content, and the caching gain in the third request packet is a maximum value of local caching gains of all forwarding devices on a path from the second user equipment 104 to the $j^{th}$ forwarding device on the second content delivery path.

The $j^{th}$ forwarding device is a previous hop of the $i^{th}$ forwarding device on the second content delivery path along the direction from the second user equipment 104 to the server 120. All forwarding devices from the second user equipment 104 to the $j^{th}$ forwarding device on the second content delivery path include the $j^{th}$ forwarding device. Any one of forwarding devices on the second content delivery path may calculate a local caching gain corresponding to the identity of the first content by using the formula (2) or the formula (3). The local caching gains of all the forwarding devices on the path from the second user equipment 104 to the $j^{th}$ forwarding device on the second content delivery path correspond to the identity of the first content. Any one of the forwarding devices on the second content delivery path may send a request packet according to the method provided in the embodiment corresponding to FIG. 2.

305. The $i^{th}$ forwarding device stores the caching gain that is in the third request packet and a parameter that identifies the $j^{th}$ forwarding device.

For example, if the caching gain in the third request packet is greater than the local caching gain corresponding to the identity of the first content, the $i^{th}$ forwarding device may store the caching gain that is in the third request packet and the parameter that identifies the $j^{th}$ forwarding device. The parameter identifying the $j^{th}$ forwarding device may be an address of the $j^{th}$ forwarding device, or an identity of an interface for receiving the third request packet. The caching gain in the third request packet corresponds to the parameter identifying the $j^{th}$ forwarding device. Specifically, the $i^{th}$ forwarding device may extend a PIT entry and write, in a PIT entry corresponding to the first content, the caching gain in the third request packet and the identity of the interface for receiving the third request packet.

For example, if the caching gain in the third request packet is less than or equal to the local caching gain corresponding to the identity of the first content, the $i^{th}$ forwarding device may further store the parameter identifying the $j^{th}$ forwarding device, or store the caching gain that is in the third request packet and the parameter that identifies the $j^{th}$ forwarding device.

In the foregoing embodiment, an $i^{th}$ forwarding device adds, in a second request packet, a larger value of a caching gain in a received first request packet and a local caching gain corresponding to an identity of first content. The $i^{th}$ forwarding device sends the second request packet through a first content delivery path. After sending the second request packet along the first content delivery path, the $i^{th}$ forwarding device receives, from a second content delivery path, a third request packet for requesting the first content, and the $i^{th}$ forwarding device no longer sends a request packet for requesting the first content to a server 120, so as to reduce a load of the server 120.

To illustrate the foregoing method for sending a request packet more clearly, an exemplary illustration of the methods for sending a request packet shown in FIG. 2 and FIG. 3 is given below with reference to FIG. 1. A first content delivery path is a packet transmission path between first user equipment 102 and a server 120. A quantity of all forwarding devices on the first content delivery path is 2. A first forwarding device 112 and a second forwarding device 114 are included on the first content delivery path. The first user equipment 102 communicates with the first forwarding device 112. The first forwarding device 112 is connected to the second forwarding device 114. The second forwarding device 114 communicates with the server 120. The server 120 may provide first content. A second content delivery path is a packet transmission path between second user equipment 104 and the server 120. A quantity of all forwarding devices on the second content delivery path is 3.

The first forwarding device 112 receives a first request packet from the first user equipment 102. The first request packet includes an identity m1 of the first content and a preset caching gain. A value of the preset caching gain is 0. If storage space occupied by content cached on the first forwarding device 112 does not reach a predefined threshold, LocalGain may be calculated by using a formula (2). For example, a popularity $r_1^{m_1}$ of the first content on the first forwarding device 112 is 100; a quantity of hops from the first forwarding device 112 to the server 120 is 2; a size $s_{m_1}$ of the first content is 1; a weight γ of the first content, a weight α of $r_1^{m_1}$, a weight β of $h_1^{m_1}$, and a weight λ of $s_{m_1}$ are all 1; and a value of LocalGain of the first forwarding device 112 is 200.

If the first forwarding device 112 determines that the preset caching gain in the first request packet is less than LocalGain of the first forwarding device 112, the first forwarding device 112 replaces the preset caching gain in the first request packet with the LocalGain of the first forwarding device 112 to obtain a second request packet. A value of a caching gain in the second request packet is 200. The caching gain in the second request packet represents a maximum value of LocalGain of all forwarding devices from the first user equipment 102 to the first forwarding device 112 on the first content delivery path. The first forwarding device 112 sends the second request packet to the second forwarding device 114. The first forwarding device 112 stores the preset caching gain that is in the first request packet and an identity of an interface for receiving the first request packet.

The second forwarding device 114 receives the second request packet from the first forwarding device 112. The second request packet includes a caching gain and m1. A value of the caching gain in the second request packet is 200. If storage space occupied by content cached on the second forwarding device 114 reaches a predefined threshold, LocalGain may be calculated by using the formula (2) or a formula (3). For example, a value of a gain $PlaceGain_2^{m_1}$ of the first content on the second forwarding device 114 is 220, and a value of a gain $PlaceGain_2^{m_2}$ of second content on the second forwarding device 114 is 50. If LocalGain of the second forwarding device 114 is calculated by using the formula (2), the LocalGain of the second forwarding device 114 is $PlaceGain_2^{m_1}$, that is, a value of the of the LocalGain of the second forwarding device 114 is 220. If the LocalGain of the second forwarding device 114 is calculated by using the formula (3), the LocalGain of the second forwarding device 114 is a difference between $PlaceGain_2^{m_1}$ and $PlaceGain_2^{m_2}$, that is, a value of the LocalGain of the second forwarding device 114 is 170.

If the LocalGain of the second forwarding device 114 is calculated by using the formula (2), and the second forwarding device 114 determines that the caching gain in the second request packet is less than the LocalGain of the second forwarding device 114, the second forwarding device 114 replaces the caching gain in the second request packet with the LocalGain of the second forwarding device 114 to obtain a third request packet. A value of a caching gain in the third request packet is 220. If the LocalGain of the second forwarding device 114 is calculated by using the formula (3), and the second forwarding device 114 determines that the caching gain in the second request packet is greater than the LocalGain of the second forwarding device 114, the second forwarding device 114 sends the second request packet as a third request packet. A value of a caching gain in the third request packet is 200.

The second forwarding device 114 sends the third request packet to the server 120. In this way, a caching gain in a request packet received by the server 120 is a maximum value of LocalGain of all forwarding devices on the first content delivery path. The second forwarding device 114 stores the caching gain that is in the second request packet and an identity of an interface for receiving the second request packet.

A network scenario shown in FIG. 1 further includes the second content delivery path. The first forwarding device 112, the second forwarding device 114, and a fourth forwarding device 118 are included on the second content delivery path. The second user equipment 104 communicates with the fourth forwarding device 118. The fourth forwarding device 118 is connected to the first forwarding device 112. The first forwarding device 112 is connected to the second forwarding device 114. The second forwarding device 114 communicates with the server 120. An overlapping path exists between the first content delivery path and the second content delivery path, that is, a path from the first forwarding device 112 to the server 120 through the second forwarding device 114 is the overlapping path.

The fourth forwarding device 118 receives a fourth request packet from the second user equipment 104. The fourth request packet includes m1 and a preset caching gain. A value of the preset caching gain is 0. If storage space occupied by content cached on the fourth forwarding device 118 does not reach a predefined threshold, LocalGain may be calculated by using the formula (2). For example, a value of LocalGain of the fourth forwarding device 118 is 300. The fourth forwarding device 118 replaces the preset caching gain in the fourth request packet with the LocalGain to obtain a fifth request packet. A value of a caching gain in the fifth request packet is 300.

After sending the second request packet, the first forwarding device 112 receives the fifth request packet of the fourth forwarding device 118 of the second content delivery path. The first forwarding device 112 no longer sends a request packet to the server 120, but stores the caching gain that is in the fifth request packet and an identity of an interface for receiving the fifth request packet.

Figure 4:
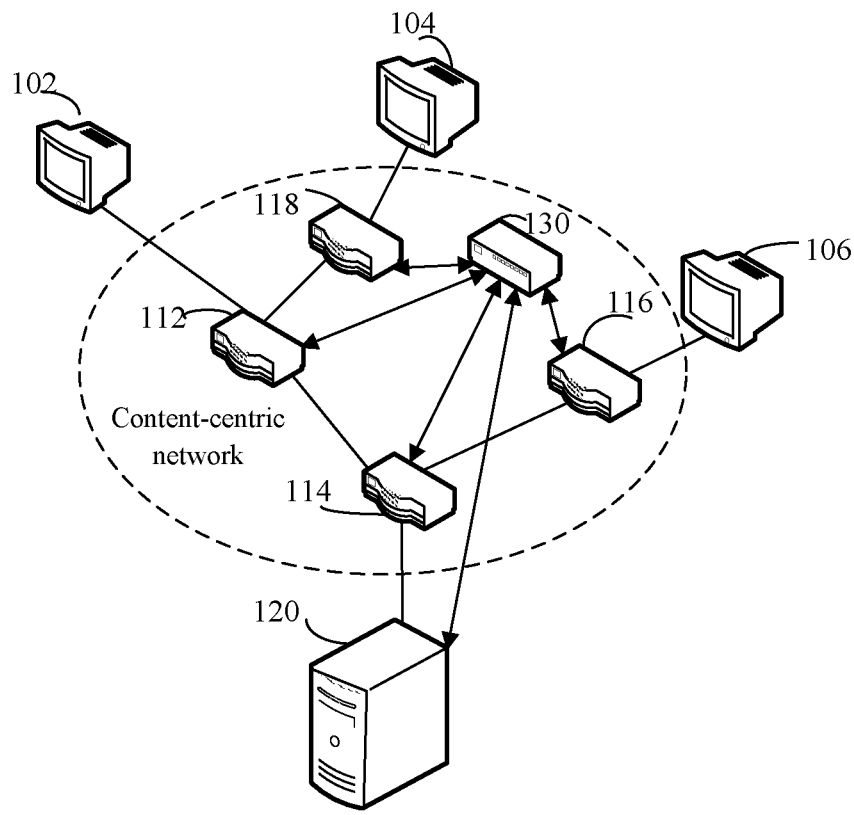
FIG. 4 is a schematic diagram of another deployment scenario according to an embodiment of the present disclosure.

FIG. 4 is a schematic diagram of another deployment scenario according to an embodiment of the present disclosure. This network environment includes at least three user equipments 102, 104, and 106, a CCN, and at least one server 120 for providing content. A controller 130 and a plurality of forwarding devices 112, 114, 116, and 118 are included in the CCN. A forwarding device may be a network device, such as a router or a switch, capable of processing a packet and forwarding a packet. The controller 130 communicates with the server 120 and the forwarding devices 112, 114, 116, and 118. The user equipment 102 communicates with the forwarding device 112 in the CCN. The user equipment 104 communicates with the forwarding device 118 in the CCN. The user equipment 106 communicates with the forwarding device 116 in the CCN. The forwarding device 112 is separately connected to the forwarding devices 114 and 118. The forwarding device 114 is separately connected to the forwarding devices 112 and 116 and the server 120. This network environment includes a plurality of content delivery paths. The controller 130 calculates, for each forwarding device, LocalGain corresponding to first content of the forwarding device, and sends a maximum value of LocalGain of all forwarding devices on a content delivery path to the server 120, reducing a load of a forwarding device relative to that in the scenario shown in FIG. 1. Certainly, the controller 130 may further obtain, from each forwarding device, LocalGain corresponding to first content and calculated by the forwarding device, and send a maximum value of LocalGain of all forwarding devices on a content delivery path to the server 120. In the following embodiments of the present disclosure, an exemplary illustration is given by using a packet transmission path between the user equipment 102 and the server 120 as a first content delivery path.

Figure 5:
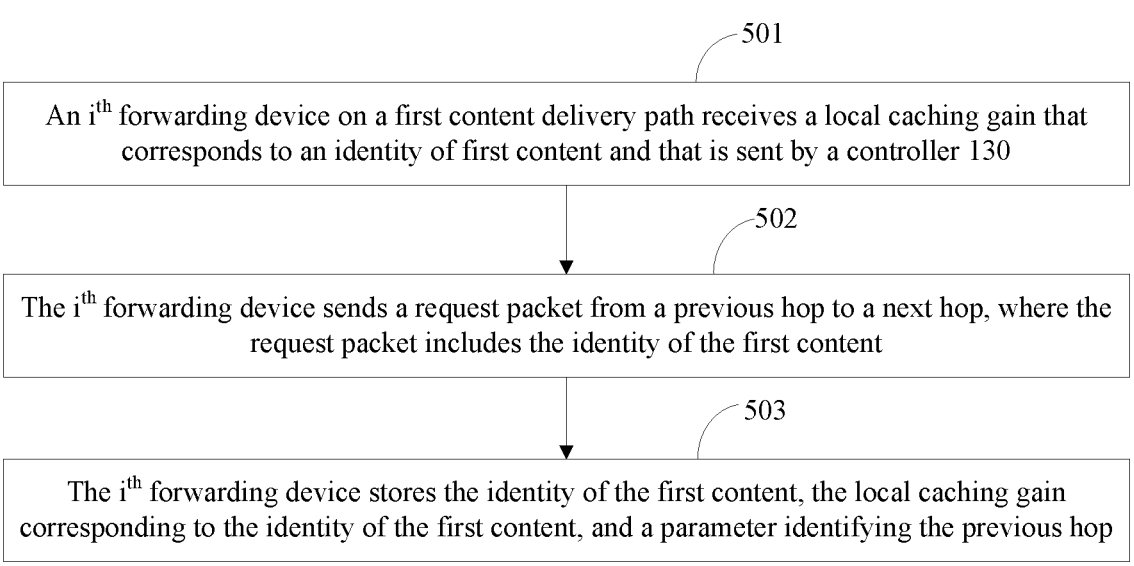
FIG. 5 is a flowchart illustrating a method for sending a request packet according to an embodiment of the present disclosure.

FIG. 5 is a flowchart illustrating a method for sending a request packet according to an embodiment of the present disclosure. The following introduces the method for sending a request packet shown in FIG. 5 in detail from a perspective of an $i^{th}$ forwarding device on a first content delivery path with reference to FIG. 4. The first content delivery path is a packet transmission path between first user equipment 102 and a server 120. A direction of transmitting a request packet on the first content delivery path is a direction from the first user equipment 102 to the server 120. A quantity of all forwarding devices on the first content delivery path is k. i is an integer that is greater than or equal to 1 and that is less than or equal to k. The method includes the following operations:

501. The $i^{th}$ forwarding device on the first content delivery path receives a local caching gain that corresponds to an identity of first content and that is sent by a controller 130.

The local caching gain corresponding to the identity of the first content may be generated by calculation by the controller 130. The controller 130 may calculate the local caching gain corresponding to the identity of the first content by using a formula (2) or a formula (3). The $i^{th}$ forwarding device may obtain the local caching gain corresponding to the identity of the first content by using a packet from the controller 130.

502. The $i^{th}$ forwarding device sends a request packet from a previous hop to a next hop, where the request packet includes the identity of the first content.

For example, the previous hop in step 502 is the first user equipment 102 or an $(i-1)^{th}$ forwarding device. The $(i-1)^{th}$ forwarding device is a previous hop of the $i^{th}$ forwarding device on the first content delivery path along a direction from the first user equipment 102 to the server 120. The next hop in step 502 is the server 120 or an $(i+1)^{th}$ forwarding device. The $(i+1)^{th}$ forwarding device is a next hop of the $i^{th}$ forwarding device on the first content delivery path along the direction from the first user equipment 102 to the server 120.

For example, the $i^{th}$ forwarding device may obtain a parameter identifying the previous hop from the controller 130. Alternatively, the $i^{th}$ forwarding device obtains a parameter identifying the previous hop through an interface for receiving the request packet. The parameter identifying the previous hop is an address of the previous hop or an identity of the interface for receiving the request packet.

503. The $i^{th}$ forwarding device stores the identity of the first content, the local caching gain corresponding to the identity of the first content, and a parameter identifying the previous hop.

In the foregoing embodiment, step 501 may be performed before step 502, or may be performed between step 502 and step 503, or may also be performed simultaneously with step 502.

In the foregoing embodiment, the $i^{th}$ forwarding device may obtain the local caching gain corresponding to the identity of the first content from the controller 130, reducing a load of a forwarding device as well as saving bandwidth consumption.

Optionally, after step 502, the method for sending a request packet further includes: storing, by the $i^{th}$ forwarding device, a second caching gain and a parameter identifying a $j^{th}$ forwarding device that are sent by the controller 130. The second caching gain is a maximum value of local caching gains of all forwarding devices on a path from second user equipment 104 to the $j^{th}$ forwarding device on a second content delivery path. The second content delivery path is a packet transmission path between the second user equipment 104 and the server 120. An overlapping path exists between the first content delivery path and the second content delivery path, that is, a path from the $i^{th}$ forwarding device to the server 120 is the overlapping path. The $j^{th}$ forwarding device is a previous hop of the $i^{th}$ forwarding device on the second content delivery path along a direction from the second user equipment 104 to the server 120. All forwarding devices from the second user equipment 104 to the $j^{th}$ forwarding device include the $j^{th}$ forwarding device. A local caching gain of any one of forwarding devices on the second content delivery path may be generated by calculation by the controller 130 according to the formula (2) or the formula (3). The local caching gains of all the forwarding devices on the path from the second user equipment 104 to the $j^{th}$ forwarding device on the second content delivery path correspond to the identity of the first content. Any one of the forwarding devices on the second content delivery path may send a request packet according to the method from step 501 to step 503.

In the foregoing embodiment, an $i^{th}$ forwarding device on a first content delivery path stores a second caching gain, and may replace a caching gain in a first data packet with the second caching gain when sending the first data packet to a $j^{th}$ forwarding device. In this way, when the $i^{th}$ forwarding device forwards first content to a second content delivery path, a forwarding device of which a local caching gain of the first content matches the second caching gain caches the first content to dynamically adjust a caching location of the first content. The local caching gain of the first content is a local caching gain corresponding to an identity of the first content.

Figure 6:
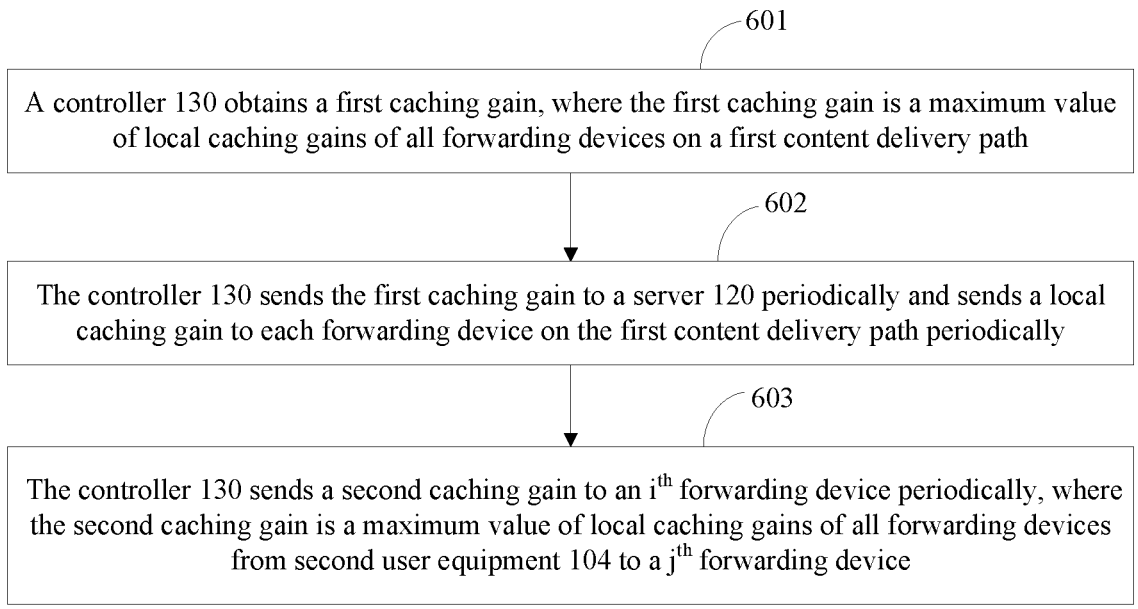
FIG. 6 is a flowchart illustrating a method for obtaining a caching gain according to an embodiment of the present disclosure.

FIG. 6 is a flowchart illustrating a method for obtaining a caching gain according to an embodiment of the present disclosure. The following introduces the method for obtaining a caching gain shown in FIG. 6 in detail from a perspective of a controller 130 with reference to FIG. 4. A first content delivery path is a packet transmission path between first user equipment 102 and a server 120. A quantity of all forwarding devices on the first content delivery path is k. i is an integer that is greater than or equal to 1 and that is less than or equal to k. The method includes the following operations:

601. The controller 130 obtains a first caching gain, where the first caching gain is a maximum value of local caching gains of all the forwarding devices on the first content delivery path.

The controller 130 may calculate, for each forwarding device on the first content delivery path, a local caching gain of the forwarding device. The local caching gain of the forwarding device is a local caching gain corresponding to an identity of first content on the forwarding device. For example, the controller 130 may periodically obtain a popularity of the first content required for calculating a gain of the first content from an $i^{th}$ forwarding device. The controller 130 may periodically calculate the local caching gain corresponding to the identity of the first content by using a formula (2) or a formula (3). The $i^{th}$ forwarding device is any one of the forwarding devices on the first content delivery path. The controller 130 may obtain the first caching gain according to the local caching gain of each forwarding device on the first content delivery path. The local caching gains of all the forwarding devices on the first content delivery path correspond to the identity of the first content.

602. The controller 130 sends the first caching gain to the server 120 periodically and sends a local caching gain to each forwarding device on the first content delivery path periodically.

The local caching gain periodically sent by the controller 130 to each forwarding device on the first content delivery path corresponds to a forwarding device receiving the local caching gain. The local caching gain corresponds to the identity of the first content.

Optionally, an overlapping path exists between a second content delivery path and the first content delivery path. The overlapping path is a path from the $i^{th}$ forwarding device to the server 120. After step 602, the method for obtaining a caching gain according to this embodiment of the present disclosure further includes:

603. The controller 130 sends a second caching gain to an $1^{th}$ forwarding device periodically, where the second caching gain is a maximum value of local caching gains of all forwarding devices on a path from second user equipment 104 to a $i^{th}$ forwarding device on a second content delivery path.

For example, the controller 130 may obtain the second caching gain by using the method in step 601. The local caching gains of all the forwarding devices on the path from the second user equipment 104 to the $j^{th}$ forwarding device on the second content delivery path correspond to the identity of the first content. Optionally, after sending the first caching gain to the server 120, the controller 130 may send the second caching gain.

In the foregoing embodiment, a controller 130 sends, to each forwarding device on a first content delivery path, a local caching gain corresponding to the forwarding device, helping each forwarding device cache first content in a first data packet when the local caching gain matches a caching gain in the first data packet. In addition, the controller 130 further sends a second caching gain to an $i^{th}$ forwarding device, and the $i^{th}$ forwarding device may replace the caching gain in the first data packet with the second caching gain when forwarding the first content to a second content delivery path. In this way, on the second content delivery path, a forwarding device of which a local caching gain matches the second caching gain caches the first content to dynamically adjust a caching location of the first content.

To illustrate the foregoing method for sending a request packet more clearly, an exemplary illustration of the method for sending a request packet shown in FIG. 5 is given below with reference to FIG. 4. A first content delivery path is a packet transmission path between first user equipment 102 and a server 120. A quantity of all forwarding devices on the first content delivery path is 2. A first forwarding device 112 and a second forwarding device 114 are included on the first content delivery path. The first user equipment 102 communicates with the first forwarding device 112. The first forwarding device 112 is connected to the second forwarding device 114. The second forwarding device 114 communicates with the server 120. The server 120 may provide first content.

A second content delivery path is a packet transmission path between second user equipment 104 and the server 120. A quantity of all forwarding devices on the second content delivery path is 3. The first forwarding device 112, the second forwarding device 114, and a fourth forwarding device 118 are included on the second content delivery path. The second user equipment 104 communicates with the fourth forwarding device 118. The fourth forwarding device 118 is connected to the first forwarding device 112. The first forwarding device 112 is connected to the second forwarding device 114. The second forwarding device 114 communicates with the server 120. An overlapping path exists between the first content delivery path and the second content delivery path, that is, a path from the first forwarding device 112 to the server 120 through the second forwarding device 114 is the overlapping path.

A controller 130 calculates LocalGain of the first forwarding device 112 to obtain a value of 200, and sends the LocalGain of the first forwarding device 112 and an address of the first user equipment 102 to the first forwarding device 112. The controller 130 calculates LocalGain of the second forwarding device 114 to obtain a value of 170, and sends the LocalGain of the second forwarding device 114 and an address of the first forwarding device 112 to the second forwarding device 114. The controller 130 calculates LocalGain of the fourth forwarding device 118 to obtain a value of 300, and sends the LocalGain of the fourth forwarding device 118 and an address of the fourth forwarding device 118 to the first forwarding device 112 and the fourth forwarding device 118.

The first forwarding device 112 sends a first request packet from the first user equipment 102 to the second forwarding device 114, where the first request packet includes an identity of first content. The first forwarding device 112 stores the LocalGain of the first forwarding device 112, the address of the first user equipment 102, and the identity of the first content, where the LocalGain the address, and the identity are from the controller 130. The first forwarding device 112 further stores the LocalGain of the fourth forwarding device 118, the address of the fourth forwarding device 118, and the identity of the first content, where the LocalGain, the address, and the identity are from the controller 130.

The second forwarding device 114 sends the first request packet from the first forwarding device 112 to the server 120. The second forwarding device 114 stores the LocalGain of the second forwarding device 114, the address of the first forwarding device 112, and the identity of the first content, where the LocalGain the address, and the identity are from the controller 130.

The fourth forwarding device 118 sends a second request packet from the second user equipment 104 to the first forwarding device 112, where the second request packet includes the identity of the first content. The fourth forwarding device 118 stores the LocalGain of the fourth forwarding device 118, an address of the second user equipment 104, and the identity of the first content, where the LocalGain the address, and the identity are from the controller 130.

In order to reduce a load of the server 120, when the first forwarding device 112 receives the second request packet after sending the first request packet, the first forwarding device 112 no longer sends a request packet to the server 120. The first forwarding device 112 may store the stored LocalGain of the fourth forwarding device 118 and the address of the fourth forwarding device 118, so as to send, to the fourth forwarding device 118, the first content from the server 120.

Figure 7:
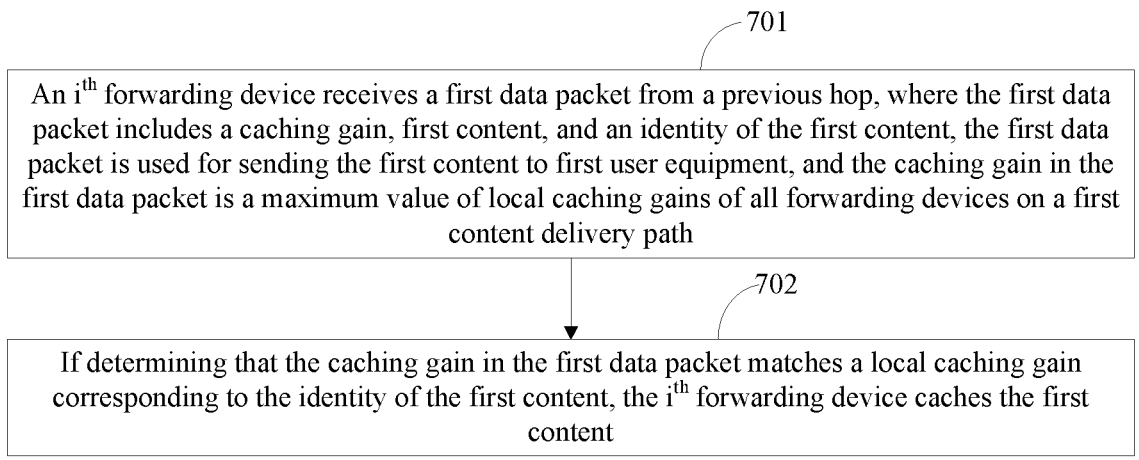
FIG. 7 is a flowchart illustrating a method for caching data according to an embodiment of the present disclosure.

FIG. 7 is a flowchart illustrating a method for caching data according to an embodiment of the present disclosure. The following introduces the method for caching data shown in FIG. 7 in detail from a perspective of an $i^{th}$ forwarding device on a first content delivery path with reference to FIG. 1 and FIG. 4. The first content delivery path is a packet transmission path between first user equipment 102 and a server 120. A direction of transmitting a data packet on the first content delivery path is a direction from the server 120 to the first user equipment 102. The first content delivery path is a packet transmission path between the first user equipment 102 and the server 120. A quantity of all forwarding devices on the first content delivery path is k. i is an integer that is greater than or equal to 1 and that is less than or equal to k. The method includes the following operations:

701. The $i^{th}$ forwarding device receives a first data packet from a previous hop, where the first data packet includes a caching gain, first content, and an identity of the first content, the first data packet is used for sending the first content to first user equipment, and the caching gain in the first data packet is a maximum value of local caching gains of all the forwarding devices on the first content delivery path.

For example, the previous hop in step 701 is the server 120 or an $(i+1)^{th}$ forwarding device. The $(i+1)^{th}$ forwarding device is a previous hop of the $i^{th}$ forwarding device on the first content delivery path along the direction from the server 120 to the first user equipment 102. The first data packet may be a packet in a format of a CCN data packet. The caching gain in the first data packet may be sent to the server 120 according to the methods provided in the embodiments corresponding to FIG. 2 and FIG. 3, or may be sent to the server 120 according to the methods provided in the embodiments corresponding to FIG. 5 and FIG. 6. The local caching gains of all the forwarding devices on the first content delivery path correspond to the identity of the first content.

702. If determining that the caching gain in the first data packet matches a local caching gain corresponding to the identity of the first content, the $i^{th}$ forwarding device caches the first content.

For example, matching may be that a caching gain on a path is the same as the local caching gain corresponding to the identity of the first content, or may be that a difference between a caching gain on a path and the local caching gain corresponding to the identity of the first content is within a preset range.

For example, that the $i^{th}$ forwarding device caches the first content includes: if storage space occupied by content cached on the $i^{th}$ forwarding device does not reach a predefined threshold, caching the first content directly; if storage space occupied by content cached on the $i^{th}$ forwarding device reaches a predefined threshold, selecting a content set that matches a size of the first content from the cached content, and replacing the content set that matches the size of the first content with the first content, where the content set includes content with a minimum gain in the cached content.

Optionally, if the $i^{th}$ forwarding device determines that the caching gain in the first data packet does not match a local caching gain corresponding to the identity of the first content, the $i^{th}$ forwarding device sends the first data packet to a device requesting the first content through the first content delivery path. The device requesting the first content is a device that sends a first request packet to the $i^{th}$ forwarding device. For example, the $i^{th}$ forwarding device may forward the first data packet according to an identity of an interface for receiving the first request packet.

In the foregoing embodiment, if a local caching gain of a forwarding device on a first content delivery path matches a caching gain in a first data packet, the forwarding device caches first content that is in the first data packet. In this way, the first content in the first data packet can be cached on a forwarding device, for example, an $i^{th}$ forwarding device, which has a largest local caching gain on the first content delivery path, implementing that a caching location of content is determined according to a popularity of the content and impact of the caching location of the content on network bandwidth.

To illustrate the foregoing method for caching data more clearly, an exemplary illustration of the method for caching data shown in FIG. 7 is given below with reference to FIG. 1 and FIG. 4. A first content delivery path is a packet transmission path between first user equipment 102 and a server 120. A quantity of all forwarding devices on the first content delivery path is k, and k=2. A first forwarding device 112 and a second forwarding device 114 are included on the first content delivery path. The first user equipment 102 communicates with the first forwarding device 112. The first forwarding device 112 is connected to the second forwarding device 114. The second forwarding device 114 communicates with the server 120. The server 120 may provide first content.

When the second forwarding device 114 calculates LocalGain by using a formula (2), a caching gain in a first data packet sent by the server 120 is the LocalGain of the second forwarding device 114, that is, a value of a caching gain on a path is 220. The server 120 sends the first data packet to the second forwarding device 114, where the first data packet includes the caching gain, first content, and an identity of the first content. The second forwarding device 114 receives the first data packet from the server 120. The second forwarding device 114 determines that the LocalGain of the second forwarding device 114 is equal to the caching gain on the path, and the second forwarding device 114 caches the first content that is in the first data packet. Because storage space occupied by content cached on the second forwarding device 114 reaches a predefined threshold, the second forwarding device 114 replaces cached second content with the first content. The second forwarding device 114 may send the first data packet to the first forwarding device 112 according to an identity of an interface for receiving a request packet. The first forwarding device 112 receives the first data packet from the second forwarding device 114. LocalGain of the first forwarding device 112 is 200. The first forwarding device 112 determines that the LocalGain of the first forwarding device 112 is less than the caching gain in the first data packet, and the first forwarding device 112 does not cache the first content that is in the first data packet. The first forwarding device 112 sends the first data packet to the first user equipment 102 according to an identity of an interface for receiving a request packet.

When the second forwarding device 114 calculates Local-Gain by using a formula (3), a caching gain in a first data packet sent by the server 120 is LocalGain of the first forwarding device 112, that is, a value of a caching gain on a path is 200. The server 120 sends the first data packet to the second forwarding device 114, where the first data packet includes the caching gain, first content, and an identity of the first content. The second forwarding device 114 receives the first data packet from the server 120. LocalGain of the second forwarding device 112 is 170. The second forwarding device 114 determines that the LocalGain of the second forwarding device 114 is less than the caching gain on the path, and the second forwarding device 114 does not cache the first content that is in the first data packet. The second forwarding device 114 sends the first data packet to the first forwarding device 112 according to an identity of an interface for receiving a request packet. Because storage space occupied by content cached on the second forwarding device 114 reaches a predefined threshold, a gain loss caused by replacing cached second content is taken into account when the LocalGain of the second forwarding device 114 is calculated, so that the second forwarding device 114 does not need to cache the first content, reducing a frequent caching operation of the second forwarding device 114. The first forwarding device 112 receives the first data packet from the second forwarding device 114. The caching gain in the first data packet is 200. The LocalGain of the first forwarding device 112 is 200. The first forwarding device 112 determines that the LocalGain of the first forwarding device 112 is the same as the caching gain in the first data packet, and the first forwarding device 112 caches the first content that is in the first data packet. The first forwarding device 112 sends the first data packet to the first user equipment 102 according to an identity of an interface for receiving a request packet. The first forwarding device 112 caches the first content. If receiving a request packet for requesting the first content again, the first forwarding device 112 sends the cached first content to a device requesting the first content, and does not need to obtain the first content from the server 120 again, thereby saving bandwidth between the first forwarding device 112 and the server 120.

Figure 8:
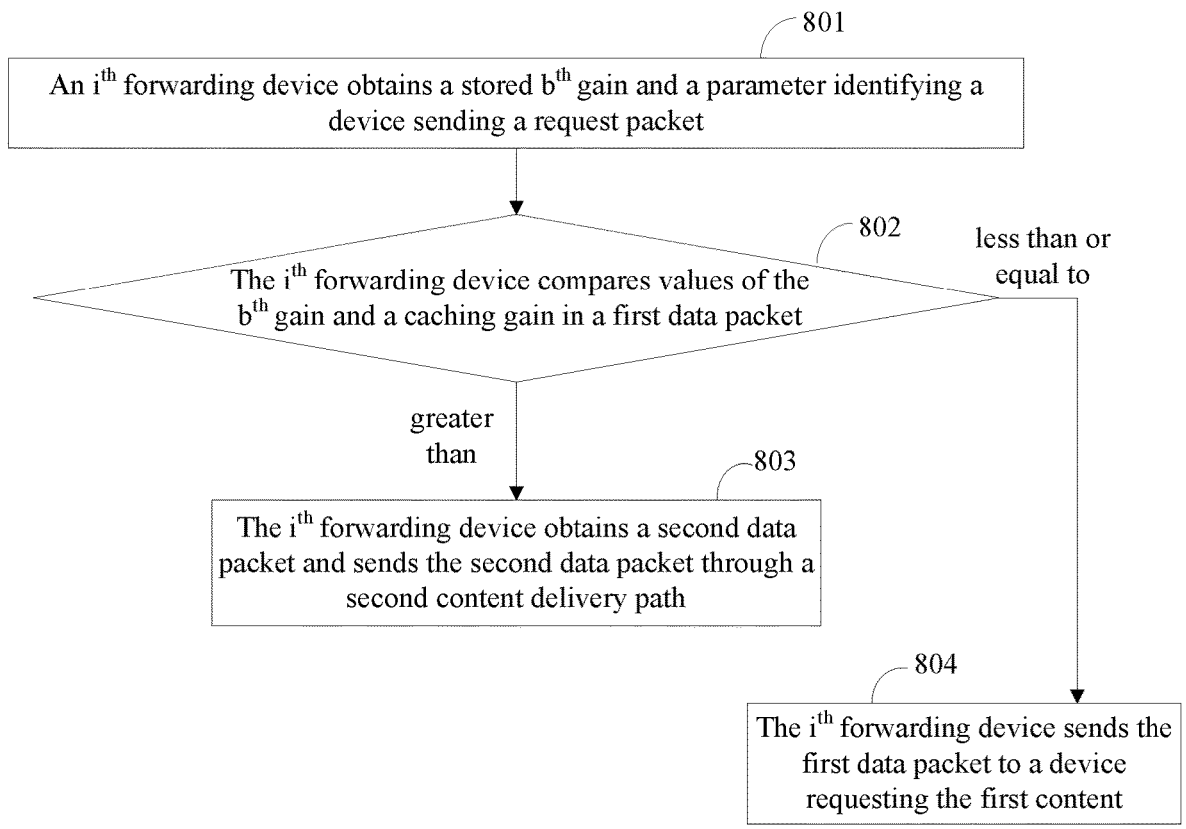
FIG. 8 is a flowchart illustrating a method for sending a data packet according to an embodiment of the present disclosure.

FIG. 8 is a flowchart illustrating a method for sending a data packet according to an embodiment of the present disclosure. The following introduces the method for sending a data packet shown in FIG. 8 in detail from a perspective of an $i^{th}$ forwarding device shared by a first content delivery path and a second content delivery path. The first content delivery path is a packet transmission path between first user equipment 102 and a server 120. A direction of transmitting a data packet on the first content delivery path is a direction from the server 120 to the first user equipment 102. The second content delivery path is a packet transmission path between second user equipment 104 and the server 120. A direction of transmitting a data packet on the second content delivery path is a direction from the server 120 to the second user equipment 104. An overlapping path exists between the second content delivery path and the first content delivery path, that is, a path from an $i^{th}$ forwarding device to the server 120 is the overlapping path. i is an integer that is greater than or equal to 1 and that is less than or equal to k. k is a quantity of forwarding devices on the first content delivery path. The method shown in FIG. 8 is performed no matter a caching gain corresponding to an identity of first content on the $i^{th}$ forwarding device matches or does not match a caching gain in a first data packet. The method includes the following operations:

801. The $i^{th}$ forwarding device obtains a stored $b^{th}$ gain and a parameter identifying a device sending a request packet.

For example, when the $b^{th}$ gain is a first caching gain, the parameter identifying the device sending the request packet is an address of the device sending the request packet or an identity of an interface for receiving the request packet. The device sending the request packet is the first user equipment 102 or an $(i-1)^{th}$ forwarding device. The first caching gain is a maximum value of local caching gains of all forwarding devices on a path from the first user equipment 102 to the $(i-1)^{th}$ forwarding device on the first content delivery path. The local caching gains of all the forwarding devices on the path from the first user equipment 102 to the $(i-1)^{th}$ forwarding device on the first content delivery path correspond to the identity of the first content. The $(i-1)^{th}$ forwarding device is a previous hop of the $i^{th}$ forwarding device on the first content delivery path along a direction from the first user equipment 102 to the server 120 and is also a next hop of the $i^{th}$ forwarding device on the first content delivery path along the direction from the server 120 to the first user equipment 102. An interface through which the $i^{th}$ forwarding device receives a request packet from the first user equipment 102 is used for identifying the $i^{th}$ forwarding device. An interface through which the $i^{th}$ forwarding device receives a request packet from the $(i-1)^{th}$ forwarding device is used for identifying the $(i-1)^{th}$ forwarding device.

For example, when the $b^{th}$ gain is a second caching gain, the parameter identifying the device sending the request packet is an address of a $j^{th}$ forwarding device or an identity of an interface connecting the $j^{th}$ forwarding device. The second caching gain is a maximum value of local caching gains of all forwarding devices on a path from the second user equipment 104 to the $j^{th}$ forwarding device on the second content delivery path. The local caching gains of all the forwarding devices on the path from the second user equipment 104 to the $j^{th}$ forwarding device on the second content delivery path correspond to the identity of the first content. The $j^{th}$ forwarding device is a previous hop of the $i^{th}$ forwarding device on the second content delivery path along a direction from the second user equipment 104 to the server 120 and is also a next hop of the $i^{th}$ forwarding device on the second content delivery path along the direction from the server 120 to the second user equipment 104.

For example, the $i^{th}$ forwarding device may obtain the $b^{th}$ gain and the parameter identifying the device sending the request packet from a PIT entry corresponding to the first content. The parameter identifying the device sending the request packet corresponds to the $b^{th}$ gain.

802. The $i^{th}$ forwarding device compares values of the $b^{th}$ gain and the caching gain in the first data packet, and if the $b^{th}$ gain is greater than the caching gain in the first data packet, step 803 is executed; otherwise, step 804 is executed.

For example, when the $b^{th}$ gain is a first caching gain, if the $b^{th}$ gain is less than or equal to the caching gain in the first data packet, step 804 is executed. When the $b^{th}$ gain is a second caching gain, if the $b^{th}$ gain is less than or equal to the caching gain in the first data packet, step 804 is executed; if the $b^{th}$ gain is greater than the caching gain in the first data packet, step 803 is executed.

803. The $i^{th}$ forwarding device obtains a second data packet and sends the second data packet through the second content delivery path.

For example, the $i^{th}$ forwarding device may replace the caching gain in the first data packet with the $b^{th}$ gain to form the second data packet. Alternatively, the $i^{th}$ forwarding device may generate the second data packet, where the second data packet includes the $b^{th}$ gain, the first content, and the identity of the first content.

For example, the $j^{th}$ forwarding device is the previous hop of the $i^{th}$ forwarding device on the second content delivery path along the direction from the second user equipment 104 to the server 120 and is also the next hop of the $i^{th}$ forwarding device on the second content delivery path along the direction from the server 120 to the second user equipment 104. The $i^{th}$ forwarding device may send the second data packet to the $j^{th}$ forwarding device through the second content delivery path according to a stored parameter identifying the $j^{th}$ forwarding device.

804. The $i^{th}$ forwarding device sends the first data packet to a device requesting the first content.

For example, the $i^{th}$ forwarding device may send the first data packet along the first content delivery path and the second content delivery path. The device requesting the first content is the first user equipment 102, the $(i-1)^{th}$ forwarding device, or the $j^{th}$ forwarding device. When the previous hop of the $i^{th}$ forwarding device on the first content delivery path along the direction from the first user equipment 102 to the server 120 is the first user equipment 102, the $i^{th}$ forwarding device sends the first data packet to the first user equipment 102 through the first content delivery path according to a stored parameter identifying the first user equipment 102. A method for sending, by the $i^{th}$ forwarding device, the first data packet to the $(i-1)^{th}$ forwarding device and the $i^{th}$ forwarding device is the same as a method for sending, by the $i^{th}$ forwarding device, the first data packet to the first user equipment 102.

In the foregoing embodiment, when forwarding a first data packet from a server 120, if a stored $b^{th}$ gain is greater than a caching gain in the first data packet, an $i^{th}$ forwarding device on a first content delivery path obtains a second data packet according to the $b^{th}$ gain. The $i^{th}$ forwarding device sends the second data packet to a forwarding device on a second content delivery path, helping the forwarding device on the second content delivery path cache first content. The foregoing embodiment implements that a caching location of the first content is adjusted dynamically when two factors of a popularity of the first content and network bandwidth change, so as to help further save the network bandwidth.

Optionally, after performing an operation of sending the first data packet and/or the second data packet, the $i^{th}$ forwarding device may clear the identity of the first content, the local caching gain corresponding to the identity of the first content, the $b^{th}$ gain, and the parameter identifying the device sending the request packet, where the identity, the local caching gain, the $b^{th}$ gain, and the parameter are stored on the $i^{th}$ forwarding device. For example, the $i^{th}$ forwarding device may clear the PIT entry corresponding to the first content.

To illustrate the foregoing method for sending a data packet more clearly, an exemplary illustration of the method for sending a data packet shown in FIG. 8 is given below with reference to FIG. 1 and FIG. 4. A server 120 may provide first content. A first content delivery path is a packet transmission path between first user equipment 102 and the server 120. A quantity of all forwarding devices on the first content delivery path is k, and k=2. A first forwarding device 112 and a second forwarding device 114 are included on the first content delivery path. A second content delivery path is a packet transmission path between second user equipment 104 and the server 120. A fourth forwarding device 118, the first forwarding device 112, and the second forwarding device 114 are included on the second content delivery path. A third content delivery path is a packet transmission path between third user equipment 106 and the server 120. A third forwarding device 116, the first forwarding device 112, and the second forwarding device 114 are included on the third content delivery path.

If the second forwarding device 114 calculates LocalGain by using a formula (3), a caching gain in a first data packet sent by the server 120 is 200. The server 120 sends the first data packet to the second forwarding device 114. The first data packet includes the caching gain, the first content, and an identity of the first content. The second forwarding device 114 receives the first data packet from the server 120. The LocalGain of the second forwarding device 114 is 170. The second forwarding device 114 determines that the LocalGain of the second forwarding device 114 is less than the caching gain in the first data packet, and the second forwarding device 114 sends the first data packet to the first forwarding device 112.

The first forwarding device 112 receives the first data packet from the second forwarding device 114. LocalGain of the first forwarding device 112 is 200. The first forwarding device 112 determines that the LocalGain of the first forwarding device 112 is the same as the caching gain in the first data packet, and the first forwarding device 112 sends the first data packet to the first user equipment 102 when caching the first content or after caching the first content. The first forwarding device 112 also stores a caching gain and an address of the fourth forwarding device 118. The caching gain stored by the first forwarding device 112 is LocalGain of the fourth forwarding device 118, with a value of 300. The first forwarding device 112 determines that the stored caching gain is greater than the caching gain in the first data packet, and the first forwarding device 112 obtains a second data packet including the stored caching gain. The first forwarding device 112 sends the second data packet to the fourth forwarding device 118. The fourth forwarding device 118 may cache the first content that is in the second data packet according to that the LocalGain of the fourth forwarding device 118 matches the caching gain in the second data packet.

The second forwarding device 114 further stores a caching gain and an address of the third forwarding device 116. The caching gain stored by the second forwarding device 114 is LocalGain of the third forwarding device 116, with a value of 150. The second forwarding device 114 determines that the stored caching gain is less than the caching gain in the first data packet, and the second forwarding device 114 sends the first data packet to the third forwarding device 116. The third forwarding device 116 may forward the first data packet to the second user equipment 104 according to that the LocalGain of the third forwarding device 116 does not match the caching gain in the first data packet.

Figure 9:
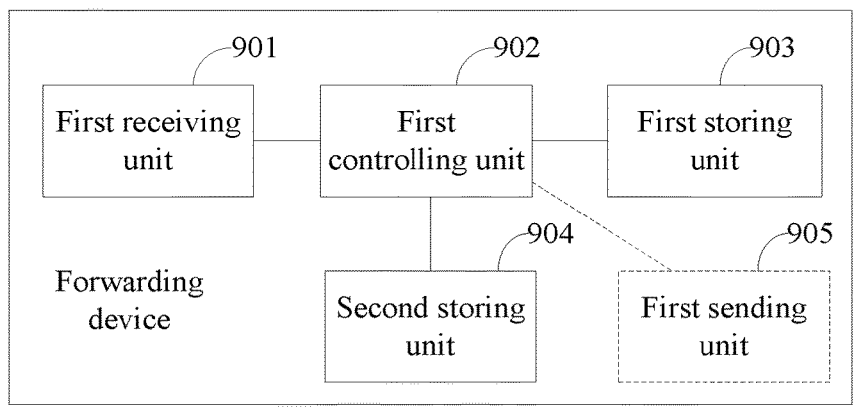
FIG. 9 is a schematic structural diagram of a forwarding device according to an embodiment of the present disclosure.

A forwarding device provided in an embodiment corresponding to FIG. 9 may be a forwarding device included on any one of content delivery paths in a network scenario shown in FIG. 1 or FIG. 4. The forwarding device shown in FIG. 9 is described below in detail with reference to FIG. 1 or FIG. 4.

The forwarding device provided in the embodiment corresponding to FIG. 9 is an $i^{th}$ forwarding device on a first content delivery path. The first content delivery path is a packet transmission path between first user equipment 102 and a server 120. A quantity of all forwarding devices on the first content delivery path is k. i is an integer that is greater than or equal to 1 and that is less than or equal to k. The $i^{th}$ forwarding device includes: a first receiving unit 901, a first controlling unit 902, a first storing unit 903, and a second storing unit 904. The first receiving unit 901 is connected to the first controlling unit 902. The first controlling unit 902 is connected to the first storing unit 903 and the second storing unit 904.

The first receiving unit 901 is configured to receive a first data packet from the server. The first data packet includes a caching gain, first content, and an identity of the first content. The caching gain in the first data packet is a maximum value of local caching gains of all the forwarding devices on the first content delivery path. The local caching gains of all the forwarding devices on the first content delivery path correspond to the identity of the first content. The local caching gains of all the forwarding devices correspond to the identity of the first content. A local caching gain corresponding to the identity of the first content is generated by calculation according to a first parameter and a popularity of the first content. The first parameter is used for identifying bandwidth consumed by transmitting the first content between the $i^{th}$ forwarding device and the server.

For example, the first data packet received by the first receiving unit 901 may be from the server 120 connected to the $i^{th}$ forwarding device, or may also be from an $(i+1)^{th}$ forwarding device connected to the $i^{th}$ forwarding device. The $(i+1)^{th}$ forwarding device is a next hop of the $i^{th}$ forwarding device on the first content delivery path along a direction from the first user equipment 102 to the server 120 and is also a previous hop of the $i^{th}$ forwarding device on the first content delivery path along a direction from the server 120 to the first user equipment 102. A data packet received by any one of the forwarding devices on the first content delivery path is the same as a data packet sent by the server 120.

The first controlling unit 902 is configured to determine whether the caching gain in the first data packet received by the first receiving unit 901 matches the local caching gain that corresponds to the identity of the first content and that is in the second storing unit 904. The local caching gain corresponding to the identity of the first content may be generated by calculation by the $i^{th}$ forwarding device, or may also be generated by calculation by a controller 130. The local caching gain corresponding to the identity of the first content may be generated by calculation by using the formula (2) or the formula (3) provided in the embodiment corresponding to FIG. 2.

For example, the first controlling unit 902 is specifically configured to: when storage space occupied by content cached in the first storing unit 903 reaches a predefined threshold, select a content set that matches a size of the first content from the cached content. The first controlling unit 902 replaces the content set with the first content. The content set may include content with a minimum gain in the cached content.

The first storing unit 903 is configured to store the first content that is in the first data packet.

The second storing unit 904 is configured to store the local caching gain corresponding to the identity of the first content.

In the foregoing embodiment, an $i^{th}$ forwarding device on a first content delivery path determines, according to whether a local caching gain of the $i^{th}$ forwarding device matches a caching gain in a first data packet, whether to cache first content that is in the first data packet. In this way, the first content in the first data packet can be cached on a forwarding device, for example, the $i^{th}$ forwarding device, which has a largest local caching gain on the first content delivery path, implementing that a caching location of content is determined according to a popularity of the content and impact of the caching location of the content on network bandwidth.

Optionally, the $i^{th}$ forwarding device further includes a first sending unit 905. The first sending unit 905 is configured to: if the first controlling unit 902 determines that the caching gain in the first data packet does not match the local caching gain that corresponds to the identity of the first content and that is stored in the second storing unit, send the first data packet to a device requesting the first content through the first content delivery path. The device requesting the first content is a device that sends a first request packet to the $i^{th}$ forwarding device. The device sending the first request packet to the $i^{th}$ forwarding device is a previous hop of the $i^{th}$ forwarding device on the first content delivery path along the direction from the first user equipment 102 to the server 120. The previous hop is the first user equipment 102 or an $(i-1)^{th}$ forwarding device.

Figure 10:
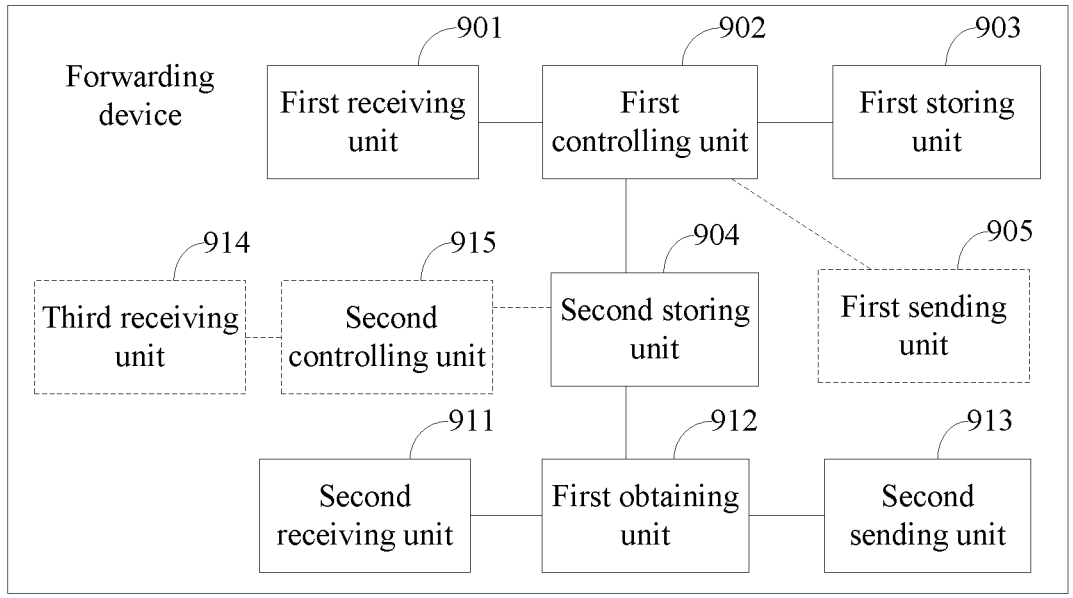
FIG. 10 is a schematic structural diagram of a forwarding device according to an embodiment of the present disclosure.

A structure for sending a request packet is added in a forwarding device provided in an embodiment corresponding to FIG. 10 based on the forwarding device provided in the embodiment corresponding to FIG. 9. The forwarding device shown in FIG. 10 is described below in detail with reference to FIG. 9, and a specific description is as follows:

The forwarding device provided in the embodiment corresponding to FIG. 10 is an $i^{th}$ forwarding device on a first content delivery path. The $i^{th}$ forwarding device includes: a first receiving unit 901, a first controlling unit 902, a first storing unit 903, a second storing unit 904, a second receiving unit 911, a first obtaining unit 912, and a second sending unit 913. Structures of the first receiving unit 901, the first controlling unit 902, the first storing unit 903, and the second storing unit 904 are the same as the corresponding structures in the embodiment corresponding to FIG. 9, and details are not described herein. The second receiving unit 911 is connected to the first obtaining unit 912. The first obtaining unit 912 is connected to the second sending unit 913.

The second receiving unit 911 is configured to receive a first request packet. The first request packet includes a caching gain and an identity of first content. The caching gain in the first request packet is a maximum value of local caching gains of all forwarding devices on a path from first user equipment to an $(i-1)^{th}$ forwarding device on the first content delivery path. The local caching gains of all the forwarding devices on the path from the first user equipment to the $(i-1)^{th}$ forwarding device on the first content delivery path correspond to the identity of the first content. The $(i-1)^{th}$ forwarding device is a previous hop of the $i^{th}$ forwarding device on the first content delivery path along a direction from the first user equipment to a server. If the $i^{th}$ forwarding device is connected to the first user equipment 102, the caching gain in the first request packet is a preset gain. If the $i^{th}$ forwarding device is connected to the $(i-1)^{th}$ forwarding device, the caching gain in the first request packet is a maximum value of local caching gains of all forwarding devices on a path from the first user equipment 102 to the $(i-1)^{th}$ forwarding device on the first content delivery path. The $(i-1)^{th}$ forwarding device is a previous hop of the $i^{th}$ forwarding device on the first content delivery path along the direction from the first user equipment 102 to the server 120.

The first obtaining unit 912 is configured to obtain a second request packet. The second request packet includes a caching gain and the identity of the first content. The caching gain in the second request packet is a maximum value of local caching gains of all forwarding devices on a path from the first user equipment to the $i^{th}$ forwarding device on the first content delivery path. The local caching gains of all the forwarding devices on the path from the first user equipment to the $i^{th}$ forwarding device on the first content delivery path correspond to the identity of the first content. The first obtaining unit 912 may obtain a local caching gain corresponding to the identity of the first content from the second storing unit 904. The first obtaining unit 912 may store, in the second storing unit 904, the caching gain in the first request packet, a parameter identifying a device sending the first request packet, and the identity of the first content. The parameter identifying the device sending the first request packet is an address of the device sending the first request packet or an identity of an interface connecting the $i^{th}$ forwarding device and the device sending the first request packet.

The second sending unit 913 is configured to send the second request packet to a next hop along the first content delivery path. The next hop is a next hop of the $i^{th}$ forwarding device on the first content delivery path along the direction from the first user equipment to the server. The next hop is the server 120 or an $(i+1)^{th}$ forwarding device.

In the foregoing embodiment, an $i^{th}$ forwarding device adds, in a second request packet, a larger value of a caching gain in a received first request packet and a local caching gain corresponding to an identity of first content, so that a server 120 may obtain a caching gain on a first content delivery path from a request packet received on the path.

Optionally, based on the forwarding device provided in the embodiment corresponding to FIG. 10, the forwarding device further includes: a third receiving unit 914 and a second controlling unit 915. The third receiving unit 914 is configured to receive a third request packet from a $j^{th}$ forwarding device. The third request packet is used for requesting the server to provide the first content. The third request packet includes a caching gain and the identity of the first content. The $j^{th}$ forwarding device is a previous hop of the $i^{th}$ forwarding device on a second content delivery path along a direction from second user equipment to the server. The second content delivery path is a packet transmission path between the second user equipment and the server. The caching gain in the third request packet is a maximum value of local caching gains of all forwarding devices on a path from the second user equipment to the $j^{th}$ forwarding device on the second content delivery path. The local caching gains of all the forwarding devices on the path from the second user equipment to the $j^{th}$ forwarding device on the second content delivery path correspond to the identity of the first content. The second controlling unit 915 is configured to store, in the second storing unit 904, the caching gain in the third request packet and a parameter identifying the $j^{th}$ forwarding device. The parameter identifying the $j^{th}$ forwarding device is an address of the $j^{th}$ forwarding device or an interface connecting the $i^{th}$ forwarding device and the $j^{th}$ forwarding device.

Figure 11:
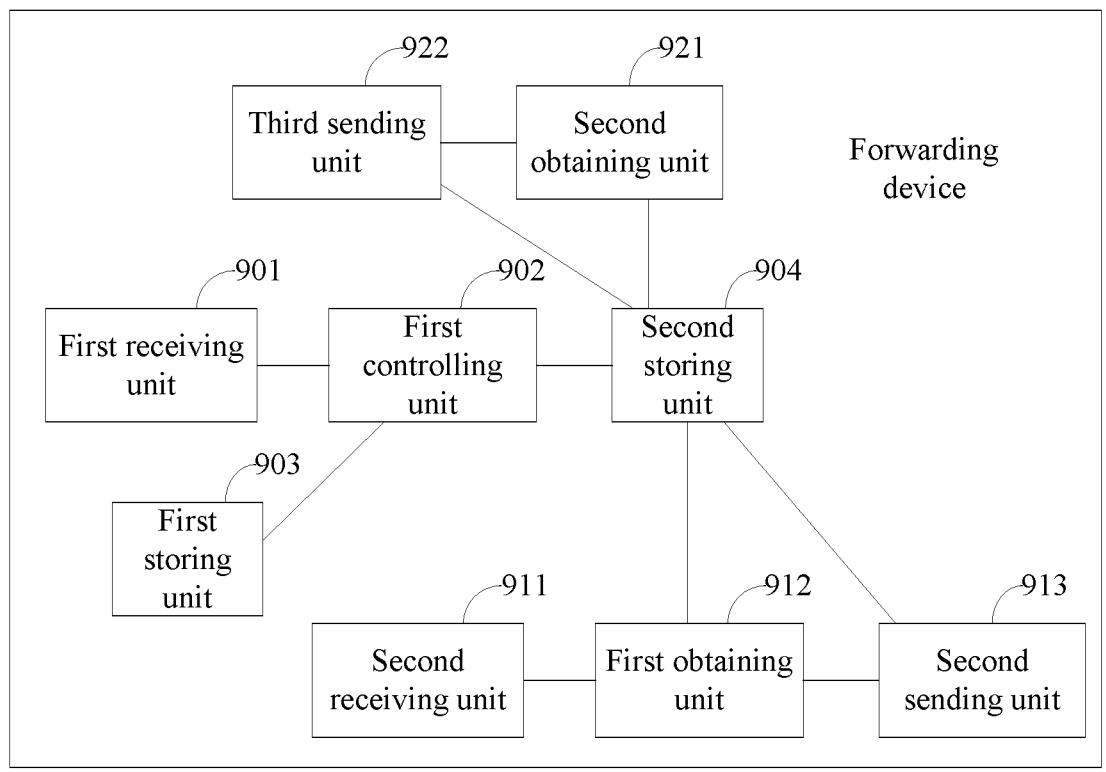
FIG. 11 is a schematic structural diagram of a forwarding device according to an embodiment of the present disclosure.

A structure for processing a data packet may be added in a forwarding device provided in an embodiment of the present disclosure based on the embodiment corresponding to FIG. 9 or FIG. 10. A forwarding device provided in an embodiment corresponding to FIG. 11 is an $i^{th}$ forwarding device on a first content delivery path. The $i^{th}$ forwarding device includes: a first receiving unit 901, a first controlling unit 902, a first storing unit 903, a second storing unit 904, a second receiving unit 911, a first obtaining unit 912, a second sending unit 913, a second obtaining unit 921, and a third sending unit 922. Structures of the first receiving unit 901, the first controlling unit 902, the first storing unit 903, the second storing unit 904, the second receiving unit 911, the first obtaining unit 912, and the second sending unit 913 are the same as the corresponding structures in the embodiment corresponding to FIG. 10. Optionally, the embodiment corresponding to FIG. 11 further includes a first sending unit 905 (not shown in FIG. 11), a third receiving unit 914 (not shown in FIG. 11), and a second controlling unit 915 (not shown in FIG. 11).

The first receiving unit 901 is configured to receive a first data packet. The first data packet includes first content, a caching gain, and an identity of the first content.

The second storing unit 904 is configured to store a local caching gain corresponding to the identity of the first content, the identity of the first content, a caching gain in a first request packet, a parameter identifying a device sending the first request packet, a caching gain in a third request packet, and a parameter identifying a $j^{th}$ forwarding device. The device sending the first request packet is first user equipment 102 or an $(i-1)^{th}$ forwarding device. The $(i-1)^{th}$ forwarding device is a previous hop of the $i^{th}$ forwarding device on a first content delivery path along a direction from the first user equipment 102 to a server 120. The $j^{th}$ forwarding device is a previous hop of the $i^{th}$ forwarding device on a second content delivery path along a direction from second user equipment 104 to the server 120.

The second obtaining unit 921 is configured to: if the caching gain that is in the third request packet and that is stored in the second storing unit 904 is greater than the caching gain in the first data packet, obtain a second data packet. The second data packet includes the caching gain in the third request packet, the first content, and the identity of the first content.

The third sending unit 922 is configured to send the second data packet to the $j^{th}$ forwarding device according to the parameter that identifies the $j^{th}$ forwarding device and that is stored in the second storing unit.

For example, the third sending unit 922 is configured to send the first data packet received by the first receiving unit 901 to a next hop. The next hop is a next hop of the $i^{th}$ forwarding device on the first content delivery path along a direction from the server 120 to the first user equipment 102. The next hop is the first user equipment 102 or the $(i-1)^{th}$ forwarding device.

In the foregoing embodiment, when forwarding a first data packet from a server 120, if a stored caching gain is greater than a caching gain in the first data packet, an $i^{th}$ forwarding device on a first content delivery path replaces the caching gain that is on a path and that is in the first data packet with the stored caching gain, and obtains a second data packet. In this way, when the $i^{th}$ forwarding device sends the second data packet through a second content delivery path, a forwarding device on the second content delivery path has an opportunity to cache first content. The foregoing embodiment implements that a caching location of the first content is adjusted dynamically when two factors of a popularity of the first content and network bandwidth change, so as to help further save the network bandwidth.

Figure 12:
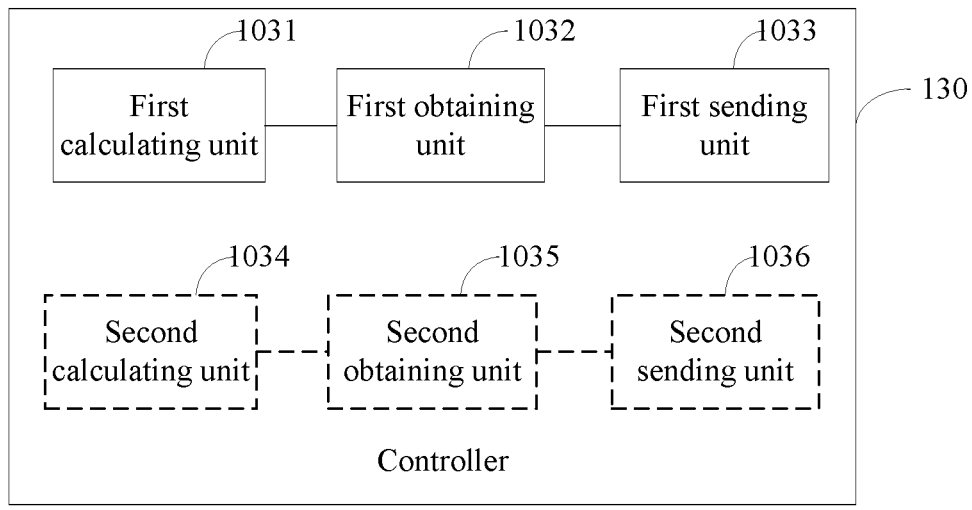
FIG. 12 is a schematic structural diagram of a controller according to an embodiment of the present disclosure.

FIG. 12 is a controller according to an embodiment of the present disclosure. The controller 130 shown in FIG. 12 is described below in detail with reference to FIG. 4. The controller 130 communicates with first user equipment, a server, and each forwarding device on a first content delivery path. The first content delivery path is a packet transmission path between the first user equipment and the server. The controller 130 includes: a first calculating unit 1031, a first obtaining unit 1032, and a first sending unit 1033.

The first calculating unit 1031 is configured to calculate a local caching gain of first content for each forwarding device on the first content delivery path. An $i^{th}$ forwarding device is any one of forwarding devices on the first content delivery path. A local caching gain of the first content of the $i^{th}$ forwarding device is generated by calculation according to a first parameter and a popularity of the first content. The first parameter is used for identifying bandwidth consumed by transmitting the first content between the $i^{th}$ forwarding device and the server.

The first obtaining unit 1032 is configured to obtain a first caching gain. The first caching gain is a maximum value of local caching gains of all the forwarding devices on the first content delivery path. The local caching gains of all the forwarding devices on the first content delivery path correspond to the identity of the first content.

The first sending unit 1033 is configured to send the first caching gain to the server periodically and send the local caching gain of the first content to the $i^{th}$ forwarding device periodically.

Optionally, the controller 130 further includes: a second calculating unit 1034, a second obtaining unit 1035, and a second sending unit 1036.

The second calculating unit 1034 is configured to calculate a local caching gain of the first content for each forwarding device on a second content delivery path. The second content delivery path is a packet transmission path between second user equipment and the server. A path overlapped between the second content delivery path and the first content delivery path is a path between the $i^{th}$ forwarding device and the server.

The second obtaining unit 1035 is configured to obtain a second caching gain. The second caching gain is a maximum value of local caching gains of all forwarding devices on a path from the second user equipment to a $j^{th}$ forwarding device on the second content delivery path. The $j^{th}$ forwarding device is a previous hop of the $i^{th}$ forwarding device on the second content delivery path along a direction from the second user equipment to the server. The local caching gains of all the forwarding devices on the path from the second user equipment to the $j^{th}$ forwarding device on the second content delivery path correspond to the identity of the first content.

The second sending unit 1036 is configured to send the second caching gain to the $i^{th}$ forwarding device periodically.

In the foregoing embodiment, a controller 130 calculates a local caching gain for each forwarding device on a first content delivery path, helping each forwarding device cache first content that is in a first data packet when the local caching gain matches a caching gain in the first data packet. In addition, the controller 130 further sends a second caching gain to an $i^{th}$ forwarding device, and the $i^{th}$ forwarding device may replace the caching gain in the first data packet with the second caching gain when forwarding the first content to a second content delivery path. In this way, on the second content delivery path, a forwarding device of which a local caching gain matches the second caching gain caches the first content to dynamically adjust a caching location of the first content.

Figure 13:
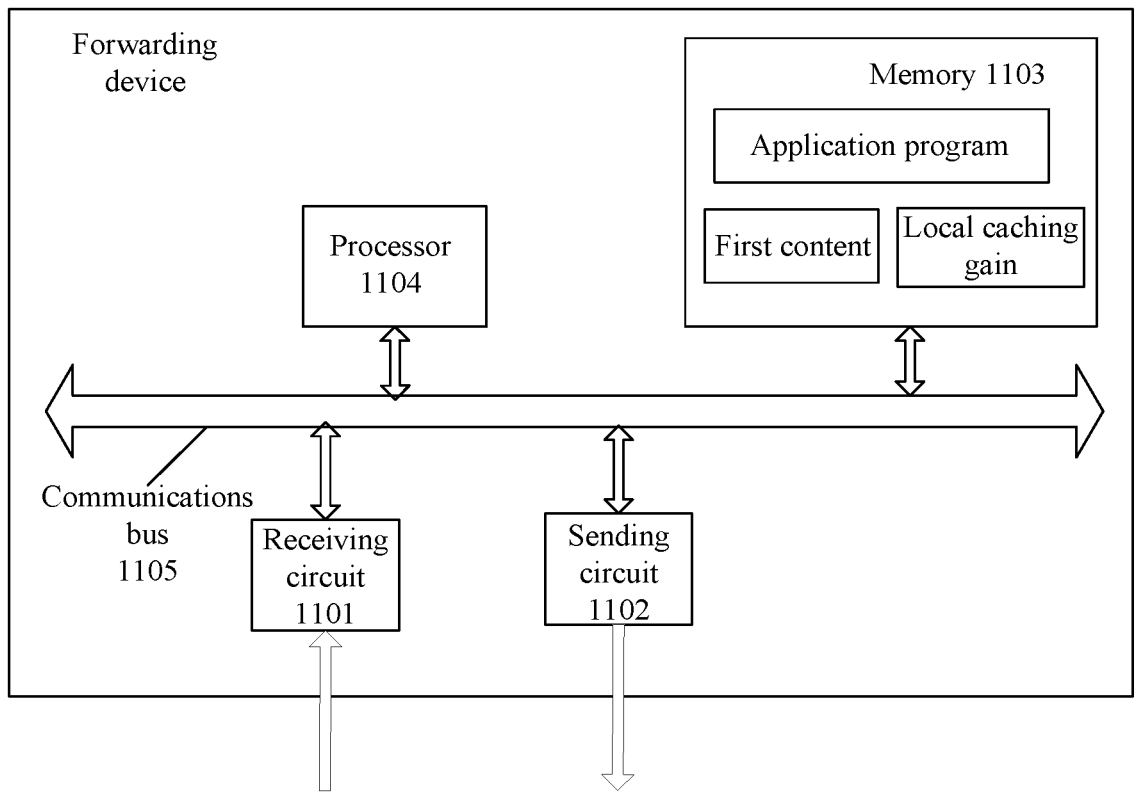
FIG. 13 is a schematic structural diagram of a forwarding device according to an embodiment of the present disclosure.

FIG. 13 shows a forwarding device. The forwarding device may be a router, or may also be a switch. The forwarding device is configured with caching space for caching content. Referring to FIG. 13, the forwarding device includes a receiving circuit 1101, a sending circuit 1102, a memory 1103, and a processor 1104. The receiving circuit 1101, the sending circuit 1102, the memory 1103, and the processor 1104 are connected through a communications bus 1105. The receiving circuit 1101 and the sending circuit 1102 may be implemented by using an Ethernet chip on the forwarding device. The forwarding device in this embodiment may be the forwarding device provided in any one of the embodiments corresponding to FIG. 9 to FIG. 11.

The memory 1103 is configured to store an application program, first content, and a local caching gain of the forwarding device. The application program may include one or more computer instructions.

The processor 1104 reads a computer instruction from the memory 1103, and performs the following operations:

receiving a first data packet from a server by using the receiving circuit 1101, where a first content delivery path is a packet transmission path between first user equipment and the server, a quantity of all forwarding devices on the first content delivery path is k, i is an integer that is greater than or equal to 1 and that is less than or equal to k, the first data packet includes a caching gain, the first content, and an identity of the first content, the caching gain in the first data packet is a maximum value of local caching gains of all the forwarding devices on the first content delivery path, and the maximum value of the local caching gains of all the forwarding devices on the first content delivery path correspond to the identity of the first content;

determining whether the caching gain in the first data packet matches a local caching gain corresponding to the identity of the first content, where the local caching gain corresponding to the identity of the first content is generated by calculation according to a first parameter and a popularity of the first content, and the first parameter is used for identifying bandwidth consumed by transmitting the first content between an $i^{th}$ forwarding device and the server; and if it is determined that the caching gain in the first data packet matches the local caching gain corresponding to the identity of the first content, caching, to the memory 1103, the first content included in the first data packet.

Optionally, the processor 1104 may send, by using the sending circuit 1102, the first data packet to a device requesting the first content.

The foregoing general-purpose processor may be a microprocessor, or the processor may also be any conventional processor. The steps in the method disclosed in the embodiments of the present disclosure may be directly implemented by a hardware processor, or may be implemented by combining hardware and software modules in a processor. When software is used for implementation, code for implementing the foregoing functions may be stored in a computer readable medium. The computer readable medium includes a computer storage medium. The storage medium may be any available medium that can be accessed by a computer. For example, but not as a limitation, the computer readable medium may be a random access memory (RAM), a read-only memory (ROM), an electrically erasable programmable read-only memory (EEPROM), a compact disc-read only memory (CD-ROM), or other optical disc storage, magnetic disk storage media or other magnetic storage devices, or any other media that can be used for carrying or storing expected program code with instructions or in data structure forms and that can be accessed by a computer. The computer readable medium may be a compact disk (CD), a laser disc, an optical disc, a digital video disc (DVD), a floppy disk, or a Blu-ray disc.

To sum up, the foregoing descriptions are merely exemplary embodiments of the technical solutions of the present disclosure, but are not intended to limit the protection scope of the present disclosure. Any modification, equivalent replacement, or improvement made within the principle of the present disclosure shall fall within the protection scope of the present disclosure.

What is claimed is:

1. A method for caching data, wherein the method comprises:

calculating, by a controller, a local caching gain of first content for each forwarding device of a plurality of forwarding devices on a first content delivery path, wherein an $i^{th}$ forwarding device is any one of the plurality of forwarding devices on the first content delivery path, a local caching gain of the first content of the $i^{th}$ forwarding device is generated by calculation according to a first parameter and a popularity of the first content, and the first parameter is used for identifying a bandwidth required for transmission of the first content between the $i^{th}$ forwarding device and a server, wherein i is an integer that is greater than or equal to 1;

obtaining, by the controller, a first caching gain, wherein the first caching gain is a maximum value of local caching gains of all of the plurality of forwarding devices on the first content delivery path, and the local caching gains of all of the plurality of forwarding devices on the first content delivery path correspond to an identity of the first content;

sending, by the controller, the first caching gain to the server; and sending, by the controller, the local caching gain of the first content to the $i^{th}$ forwarding device.

2. The method according to claim 1, further comprising:

calculating, by the controller, a local caching gain of the first content for each forwarding device of a plurality of forwarding devices on a second content delivery path, wherein the second content delivery path is a packet transmission path between a second user equipment and the server, and a path overlapped between the second content delivery path and the first content delivery path is a path between the $i^{th}$ forwarding device and the server;

obtaining, by the controller, a second caching gain, wherein the second caching gain is a maximum value of local caching gains of all forwarding devices on a path from the second user equipment to a $j^{th}$ forwarding device on the second content delivery path, the local caching gains of all the forwarding devices on the path from the second user equipment to the $j^{th}$ forwarding device on the second content delivery path correspond to the identity of the first content, and the $j^{th}$ forwarding device is a previous hop of the $i^{th}$ forwarding device on the second content delivery path along a direction from the second user equipment to the server; and sending, by the controller, the second caching gain to the $i^{th}$ forwarding device.

3. A system, wherein the system comprises a forwarding device, wherein the forwarding device is located on a first content delivery path, a first content delivery path is a packet transmission path between a first user equipment and a server, the forwarding device is an $i^{th}$ forwarding device of i forwarding devices on the first content delivery path, i is an integer that is greater than or equal to 1 and that is less than or equal to k, and the forwarding device comprises:

a memory, configured to store a local caching gain corresponding to an identity of first content;

a receiving circuit, configured to receive a first data packet from the server, wherein the first data packet comprises a caching gain, the first content, and the identity of the first content, the caching gain in the first data packet is a maximum value of local caching gains of all the i forwarding devices on the first content delivery path, the local caching gain corresponding to the identity of the first content is generated by calculation according to a first parameter and a popularity of the first content, the first parameter is used for identifying bandwidth required for transmission of the first content between the $i^{th}$ forwarding device and the server, and the local caching gains of all the forwarding devices on the first content delivery path correspond to the identity of the first content; and a processor, configured to determine whether the caching gain in the first data packet matches the local caching gain that corresponds to the identity of the first content and that is stored in the memory;

wherein the memory is further configured to: in response to the processor detemining that the caching gain in the first data packet matches the local caching gain that corresponds to the identity of the first content and that is stored in the memory, cache the first content that is in the first data packet.

4. The system according to claim 3, wherein the forwarding device further comprises:

a sending circuit, configured to: in response to the processor determining that the caching gain in the first data packet does not match the local caching gain that corresponds to the identity of the first content and that is stored in the memory, send the first data packet through the first content delivery path to a device requesting the first content, wherein the device requesting the first content is a device that sends a first request packet to the $i^{th}$ forwarding device, and the first request packet is used for requesting the server to provide the first content.

5. The system according to claim 4, wherein the receiving circuit is further configured to receive the first request packet, wherein the first request packet is used for requesting the server to provide the first content, the first request packet comprises a caching gain and the identity of the first content, the caching gain in the first request packet is a maximum value of local caching gains of all forwarding devices on a path from the first user equipment to an $(i-1)^{th}$ forwarding device on the first content delivery path, the $(i-1)^{th}$ forwarding device is a previous hop of the $i^{th}$ forwarding device on the first content delivery path along a direction from the first user equipment to the server, and the local caching gains of all the forwarding devices on the path from the first user equipment to the $(i-1)^{th}$ forwarding device on the first content delivery path correspond to the identity of the first content;

the processor is further configured to obtain a second request packet, wherein the second request packet comprises a caching gain and the identity of the first content, the caching gain in the second request packet is a maximum value of local caching gains of all forwarding devices on a path from the first user equipment to the $i^{th}$ forwarding device on the first content delivery path, and the local caching gains of all the forwarding devices on the path from the first user equipment to the $i^{th}$ forwarding device on the first content delivery path correspond to the identity of the first content; and the sending circuit is further configured to send the second request packet to a next hop along the first content delivery path, wherein the next hop is a next hop of the $i^{th}$ forwarding device on the first content delivery path along the direction from the first user equipment to the server.

6. The system according to claim 5, wherein the receiving circuit is further configured to receive a third request packet from a $j^{th}$ forwarding device, wherein the third request packet is used for requesting the server to provide the first content, the third request packet comprises a caching gain and the identity of the first content, the $j^{th}$ forwarding device is a previous hop of the $i^{th}$ forwarding device on a second content delivery path along a direction from a second user equipment to the server, the second content delivery path is a packet transmission path between the second user equipment and the server, the caching gain in the third request packet is a maximum value of local caching gains of all forwarding devices on a path from the second user equipment to the $j^{th}$ forwarding device on the second content delivery path, and the local caching gains of all the forwarding devices on the path from the second user equipment to the $j^{th}$ forwarding device on the second content delivery path correspond to the identity of the first content; and the processor is further configured to store, in the memory, the caching gain that is in the third request packet and a parameter that identifies the $j^{th}$ forwarding device.

7. The system according to claim 6, wherein the processor is further configured to: in response to the caching gain that is in the third request packet and that is stored in the memory being greater than the caching gain in the first data packet, obtain a second data packet, wherein the second data packet comprises the caching gain in the third request packet, the first content, and the identity of the first content; and the sending circuit is further configured to send the second data packet to the $j^{th}$ forwarding device according to the parameter that identifies the $j^{th}$ forwarding device and that is stored in the memory.

8. A system, comprising a controller, wherein the controller communicates with a first user equipment, a server, and each forwarding device on a first content delivery path, the first content delivery path is a packet transmission path between the first user equipment and the server, and the controller comprises:

a processor, configured to calculate a local caching gain of first content for each forwarding device of a plurality of forwarding devices on the first content delivery path, wherein an $i^{th}$ forwarding device is any one of the plurality of forwarding devices on the first content delivery path, a local caching gain of the first content of the $i^{th}$ forwarding device is generated by calculation according to a first parameter and a popularity of the first content, and the first parameter is used for identifying a bandwidth consumed by transmitting the first content between the $i^{th}$ forwarding device and the server; and obtain a first caching gain, wherein the first caching gain is a maximum value of local caching gains of all the plurality of forwarding devices on the first content delivery path, and the local caching gains of all the plurality of forwarding devices on the first content delivery path correspond to an identity of the first content; and a sending circuit, configured to send the first caching gain to the server and send the local caching gain of the first content to the $i^{th}$ forwarding device.

9. The system according to claim 8, wherein the processor is further configured to calculate a local caching gain of the first content for each forwarding device on a second content delivery path, wherein the second content delivery path is a packet transmission path between a second user equipment and the server, and a path overlapped between the second content delivery path and the first content delivery path is a path between the $i^{th}$ forwarding device and the server; and obtain a second caching gain, wherein the second caching gain is a maximum value of local caching gains of all forwarding devices on a path from the second user equipment to a $j^{th}$ forwarding device on the second content delivery path, the local caching gains of all the forwarding devices on the path from the second user equipment to the $j^{th}$ forwarding device on the second content delivery path correspond to the identity of the first content, and the $j^{th}$ forwarding device is a previous hop of the $i^{th}$ forwarding device on the second content delivery path along a direction from the second user equipment to the server; and the sending circuit is further configured to send the second caching gain to the $i^{th}$ forwarding device.

* * * * *

UNITED STATES PATENT AND TRADEMARK OFFICE
CERTIFICATE OF CORRECTION

PATENT NO. : 10,728,357 B2
APPLICATION NO. : 16/396358
DATED : July 28, 2020
INVENTOR(S) : Liu Page 1 of 1

It is certified that error appears in the above-identified patent and that said Letters Patent is hereby corrected as shown below:

In the Claims

Claim 3, Column 34, Line 17: "to the processor detemining that the caching gain in the" should read
-- to the processor determining that the caching gain in the --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*